US010043336B2

(12) United States Patent
Erikawa

(10) Patent No.: US 10,043,336 B2
(45) Date of Patent: Aug. 7, 2018

(54) PRODUCT STORAGE DEVICE

(71) Applicant: FUJI ELECTRIC CO., LTD., Kawasaki-shi, Kanagawa (JP)

(72) Inventor: Hajime Erikawa, Kumagaya (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/198,751

(22) Filed: Jun. 30, 2016

(65) Prior Publication Data

US 2016/0314643 A1 Oct. 27, 2016

Related U.S. Application Data

(63) Continuation of application No. PCT/JP2014/075309, filed on Sep. 24, 2014.

(30) Foreign Application Priority Data

Jan. 31, 2014 (JP) ................................ 2014-017525

(51) Int. Cl.
*G07F 11/16* (2006.01)
*B65G 59/00* (2006.01)
(Continued)

(52) U.S. Cl.
CPC ........ *G07F 17/0064* (2013.01); *G07F 11/005* (2013.01); *G07F 11/42* (2013.01); *G07F 11/60* (2013.01); *G07F 11/64* (2013.01)

(58) Field of Classification Search
CPC .... G07F 17/0064; G07F 11/005; G07F 11/60; G07F 11/42
(Continued)

(56) References Cited

U.S. PATENT DOCUMENTS 5,000,393 A * 3/1991 Madsen ................. A47K 10/38 221/297
6,073,785 A * 6/2000 Tolfsen .............. B65G 47/8823 211/183
(Continued)

FOREIGN PATENT DOCUMENTS

JP S54-67694 U 5/1979
JP 2000276644 A * 3/1999
(Continued)

OTHER PUBLICATIONS

PCT, "International Search Report for International Application No. PCT/JP2014/075309".
(Continued)

*Primary Examiner* — Rakesh Kumar
(74) *Attorney, Agent, or Firm* — Manabu Kanesaka

(57) ABSTRACT

A product storage device includes: a product storage column storing products aligned in a row in a product storage path; a first gate moving back from and forward to a most downstream area that is downstream of a most downstream product in the product storage path; a second gate disposed in an upstream side with respect to the first gate and moving back from and forward to the most downstream area; a gate operation mechanism keeping the first and second gates in a state of having moved forward to the most downstream area in a standby state and to allow them to move back from the most downstream area when an operation command is given; and a measuring unit measuring the number of taken-out products by counting the number of changes in at least one of the first and second gates from a backward movement to a forward movement.

15 Claims, 21 Drawing Sheets

(51) Int. Cl.

| | |
|---|---|
| ***B65H 3/00*** | (2006.01) |
| ***G07F 17/00*** | (2006.01) |
| ***G07F 11/42*** | (2006.01) |
| ***G07F 11/60*** | (2006.01) |
| ***G07F 11/64*** | (2006.01) |
| ***G07F 11/00*** | (2006.01) |

(58) Field of Classification Search
USPC .............................................. 221/129, 9, 251
See application file for complete search history.

(56) References Cited

U.S. PATENT DOCUMENTS

| | | | | | |
|---|---|---|---|---|---|
| 6,112,502 | A * | 9/2000 | Frederick | G06F 19/3462 | 221/10 |
| 6,112,943 | A * | 9/2000 | Lauer | G07F 11/48 | 211/59.2 |
| 6,409,045 | B1 * | 6/2002 | Lauer | G07F 11/38 | 221/124 |
| 7,349,858 | B1 * | 3/2008 | McGrady | G06F 19/3462 | 705/3 |
| 7,628,291 | B2 * | 12/2009 | Tasso | G07F 11/045 | 221/123 |
| 9,038,852 | B2 * | 5/2015 | Yasaka | G07F 11/60 | 221/1 |
| 2013/0299509 | A1 * | 11/2013 | Yasaka | G07F 11/60 | 221/9 |
| 2016/0314643 | A1 * | 10/2016 | Erikawa | G07F 11/60 | |

FOREIGN PATENT DOCUMENTS

| | | | | | |
|---|---|---|---|---|---|
| JP | 2000-276644 | A | | 10/2000 | |
| JP | 2000276644 | A | * | 10/2000 | |
| JP | 2003-085633 | A | | 3/2003 | |
| JP | 2013065191 | A | * | 3/2003 | |
| JP | 2012194725 | A | * | 3/2011 | |
| JP | 2012-194725 | A | | 10/2012 | |
| JP | 2012194725 | A | * | 10/2012 | |
| JP | 2013-065191 | A | | 4/2013 | |
| WO | WO-2015114878 | A1 | * | 8/2015 | G07F 11/60 |
| WO | WO-2017022441 | A1 | * | 2/2017 | G07F 11/38 |
| WO | WO-2017022442 | A1 | * | 2/2017 | G07F 11/38 |

OTHER PUBLICATIONS

China Patent Office, "Office Action for Chinese Patent Application No. 201480071643.3," dated Dec. 4, 2017.

* cited by examiner

PRODUCT STORAGE DEVICE

CROSS-REFERENCE TO RELATED APPLICATION(S)

This application is a continuation of PCT international application Ser. No. PCT/JP2014/075309 filed on Sep. 24, 2014 which designates the United States, incorporated herein by reference, and which claims the benefit of priority from Japanese Patent Application No. 2014-017525, filed on Jan. 31, 2014, the entire contents of all of which are incorporated herein by reference.

BACKGROUND

The present disclosure relates to a product storage device.

A product storage device configured with a product storage column, a main gate, a sub gate, and a vending mechanism is known as a device for vending a product such as a plastic bottled beverage.

The product storage column stores products in a product storage path in a manner aligned in a row in an upright position. The main gate is rotatably provided in a manner moving back and forward from and to the product storage path.

The sub gate is rotatably provided in a manner moving back and forward from and to the product storage path in coordination with the main gate. The sub gate moves back from the product storage path when the main gate moves forward to the product storage path. When the main gate moves back from the product storage path, the sub gate moves forward to the product storage path and restricts a forward move of a product right behind the forefront product placed in the forefront.

In a standby state, the vending mechanism maintains the main gate in a state of having moved forward to the product storage path and restricts the forefront product to be taken out. Upon receipt of a vending command, the vending mechanism allows the main gate to move back from the product storage path. When the main gate moves back from the product storage path in response to the operation of taking out the forefront product, the vending mechanism maintains the sub gate in a state of having moved forward to the product storage path.

This kind of product storage device restricts the products to be taken out from the product storage path in a standby state and has the forefront product alone taken out and vended upon receipt of a vending command (for example, see Japanese Patent Application Laid-open No. 2012-194725).

Some regions need a product storage device that enables the vending of a plurality of products in a single vending opportunity by identifying the customer by a credit card or the like.

The above-described product storage device is, however, configured to vend only the forefront product upon receipt of the vending command, in other words, vend one product in a single vending opportunity, thereby not meeting the need.

There is a need for a product storage device that enables the vending of a plurality of products in a single vending opportunity.

SUMMARY

Our product storage device includes: a product storage column configured to store products in a manner aligned in a row in a product storage path defined by the product storage column; a first gate configured to move back from and forward to a most downstream area that is downstream of a product positioned in a most downstream side of the product storage path; a second gate disposed in an upstream side with respect to the first gate and configured to move back from and forward to the most downstream area; a gate operation mechanism configured to keep the first gate and the second gate in a state of having moved forward to the most downstream area in a standby state and to allow the first gate and the second gate to move back from the most downstream area when an operation command is given; and a measuring unit configured to measure number of products taken out from the product storage path by counting number of changes in at least one of the first gate and the second gate from a backward movement to a forward movement.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

A preferable embodiment of a product storage device according to the present disclosure will now be described in detail with reference to the accompanying drawings.

Figure 1:
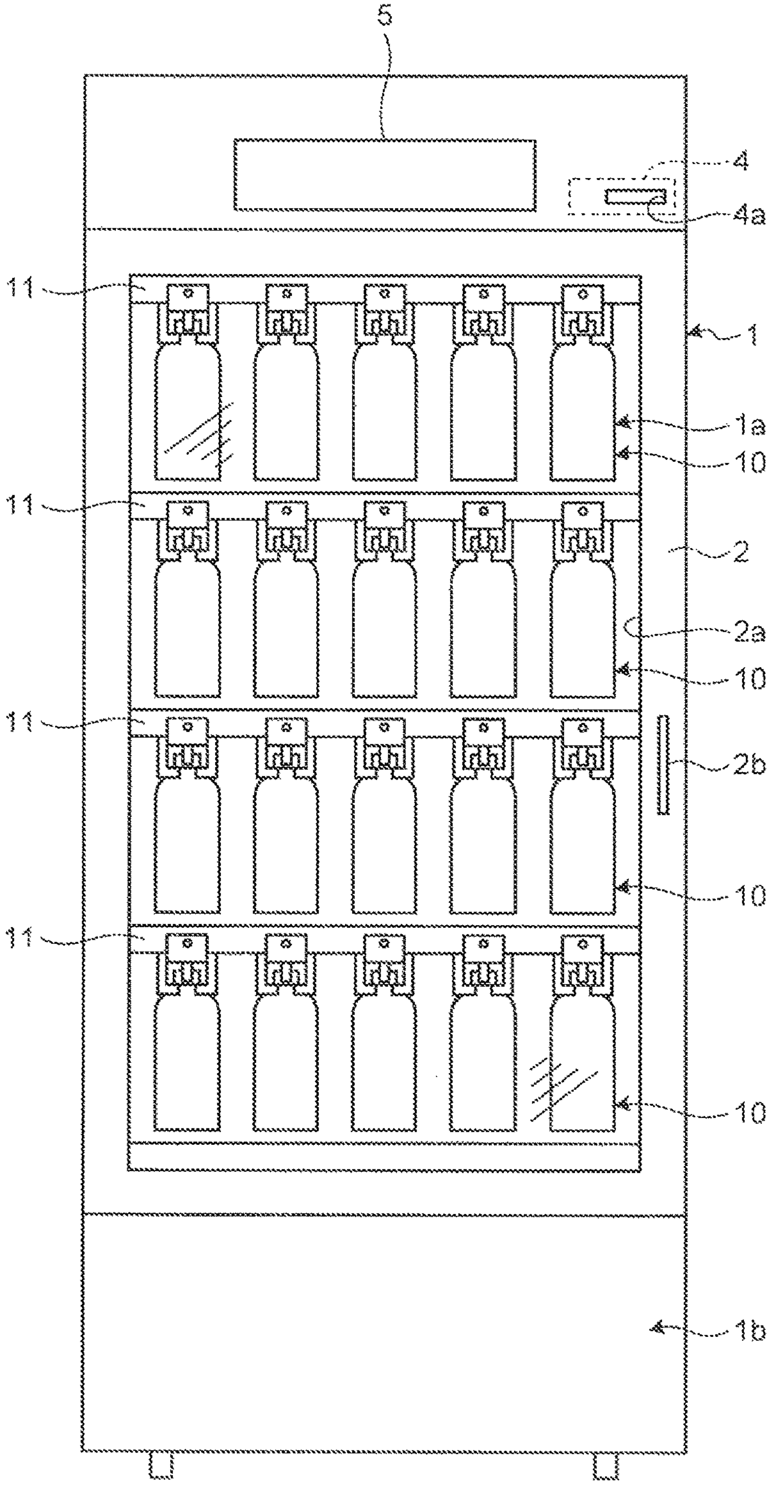
FIG. 1 is a front view that illustrates a product vending device adopting a product storage device in an embodiment of the present disclosure.

FIG. 1 is a front view that illustrates a product vending device adopting a product storage device in the embodiment of the present disclosure. The product vending device vends products such as a canned beverage and a plastic bottled beverage in a cooled or warmed condition. The product vending device includes a main cabinet 1.

The main cabinet 1 is a rectangular parallelepiped housing with an opening formed on the front surface and opened and closed by an outer door 2. Insulation is used for the outer door 2 as appropriate, and the outer door 2 has a window portion 2*a* with a transparent panel such as insulation glass fit thereinto. The inside of the product vending device is viewable through the window portion 2*a* of the outer door 2. In addition, a handle 2*b* is provided in the center part on the right end on the front surface of the outer door 2.

Figure 12:
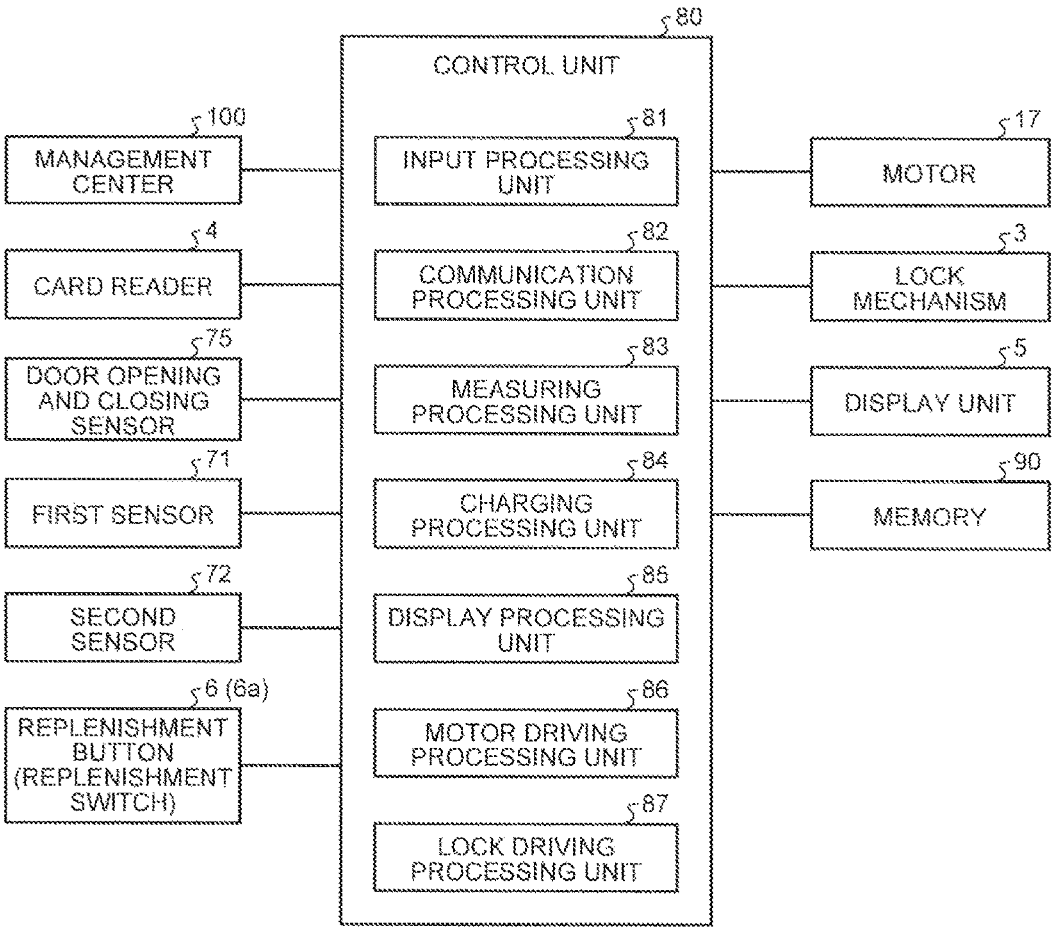
FIG. 12 is a block diagram that schematically illustrates a characteristic control system of the above-described product storage device.

The opening and closing of the outer door 2 is restricted by a lock mechanism 3 (see FIG. 12). The opening of the outer door 2 is restricted when the lock mechanism 3 is in a locked state, whereas the opening of the outer door 2 is allowed when the lock mechanism 3 is in an unlocked state.

The inside of the main cabinet 1 has a storage room 1*a* and a machinery room 1*b*. The storage room 1*a* is a room maintaining a predetermined temperature. Insulation is used for the wall members configuring the storage room 1*a*. The storage room 1*a* further has a unit to cool the air inside the storage room 1*a*, for example, an evaporator (not illustrated) and a unit to warm the air inside the storage room 1*a*, for example, an electric heater (not illustrated). The machinery room 1*b* is disposed below the storage room 1*a*. The machinery room 1*b* is disposed below the storage room 1*a* and has a cooler configuring a cooling cycle and various kinds of control devices, which are not illustrated, together with the above-described evaporator.

A card reader 4 and a display unit 5 are disposed in the upper part of the main cabinet 1. The card reader 4 reads out identification information of a credit card inserted through a card insertion hole 4*a* and provides the read identification information to a later-described control unit (a controller or a processor) 80 (see FIG. 12).

A product vending device for vending products with a credit card will be described in this embodiment; however, the embodiment is not limited thereto. The product storage device may be applicable to such a product vending device that vends products with a recording medium recording electric money or the like.

The display unit 5 is disposed on the left side of the card insertion hole 4*a*. The display unit 5 displays various kinds of information in response to a display command input from the control unit 80.

A door (not illustrated) is disposed on the upper side surface of the main cabinet 1. The door is opened and closed only by administrators or the like of the product vending device. When the door is opened, a replenishment button 6 (see FIG. 12) is exposed. When the replenishment button 6 is pressed, a built-in replenishment switch 6*a* (see FIG. 12) is turned on and outputs a replenishing command to the control unit 80.

A product storage device is disposed in the storage room 1*a* in the main cabinet 1. The product storage device is configured with a plurality of (four in the illustrated examples) product storage racks 10. The product storage racks 10 are arranged in a plurality of tiers along the vertical direction with rack rods 11 extending along the lateral direction and suspended over right-left pairs of rack supporting side panels (not illustrated).

Figure 2:
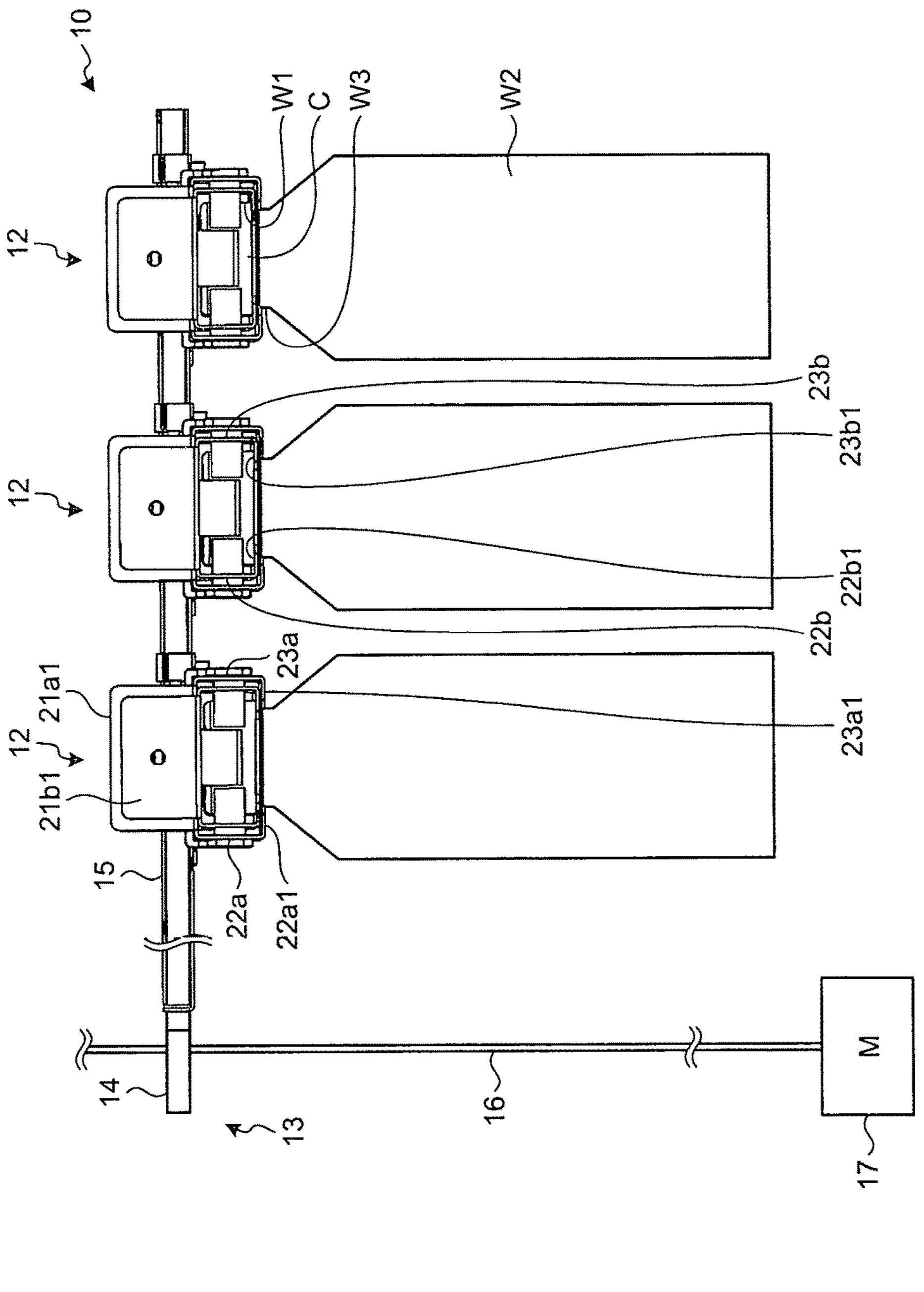
FIG. 2 is a front view that illustrates a main portion of a product storage rack illustrated in FIG. 1.
Figure 3:
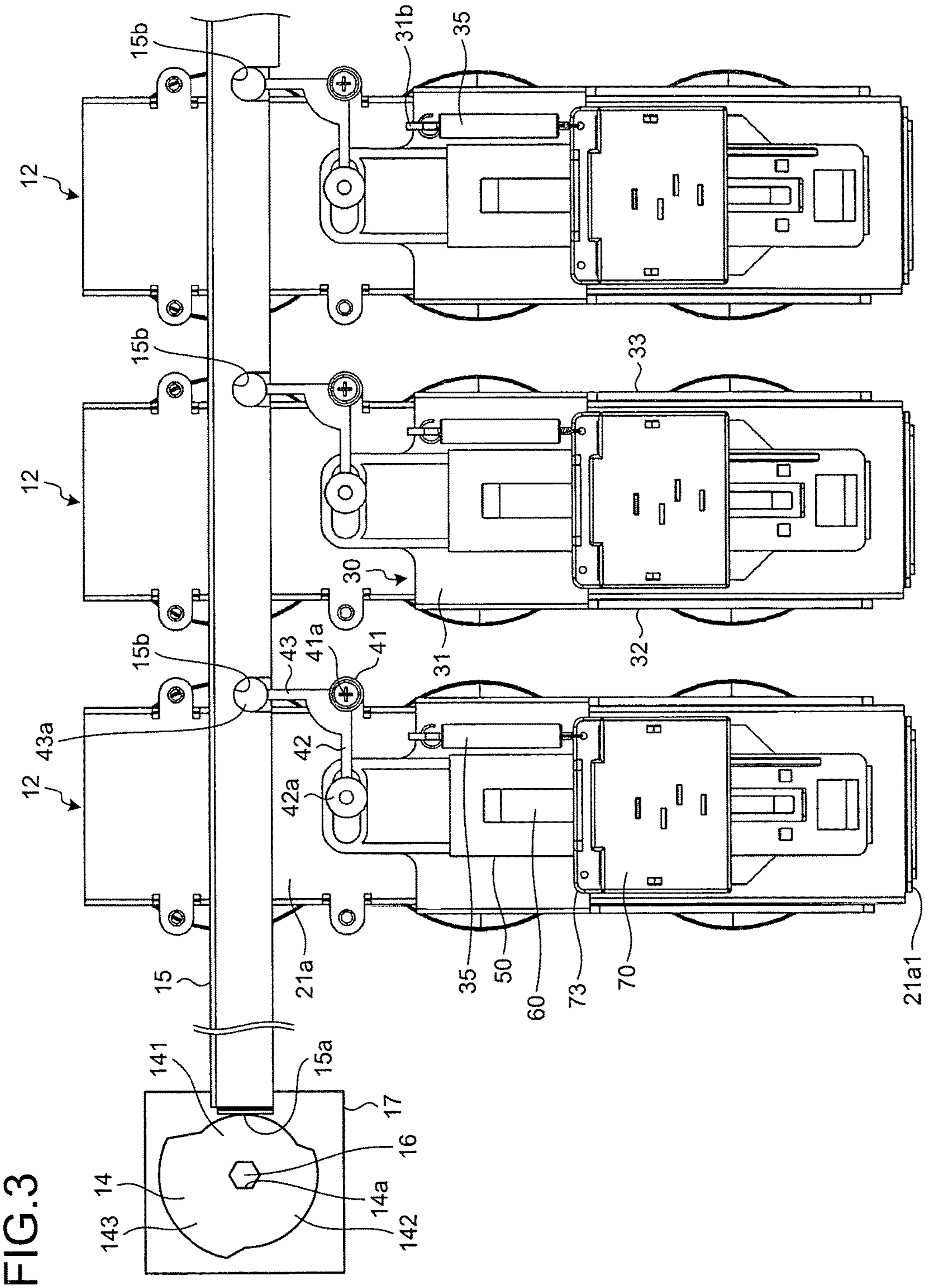
FIG. 3 is a planar view that illustrates the main portion of the product storage rack illustrated in FIG. 1.
Figure 4:
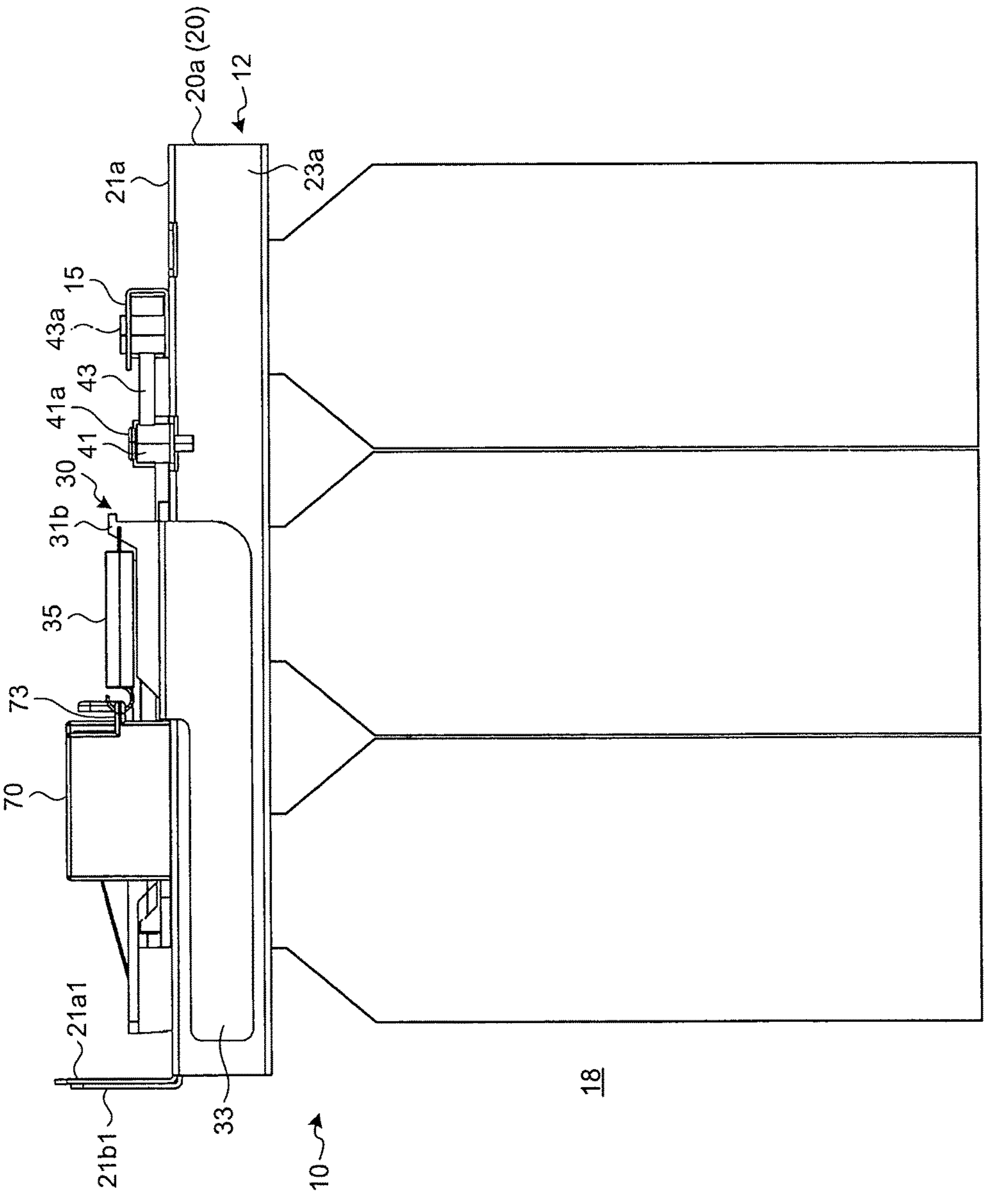
FIG. 4 is a right-side view that illustrates the main portion of the product storage rack illustrated in FIG. 1.

FIGS. 2 to 4 are drawings that illustrate a main portion of one of the product storage racks illustrated in FIG. 1. FIG. 2 is a front view, FIG. 3 is a planar view, and FIG. 4 is a right-side view. The product storage rack 10 illustrated in FIGS. 2 to 4 stores products of a plastic bottled beverage, and the product storage rack 10 in each drawing has the same configuration.

The product of a plastic bottled beverage is configured such that a beverage is sealed in a container (a plastic bottle) having a cap fitting portion W1 onto which a cap C is fit in an attachable and detachable manner, a body portion W2, and a neck portion W3 formed between the cap fitting portion W1 and the body portion W2.

The product storage rack 10 is configured with a plurality of product storage columns 12 connected to the rack rod 11 and aligned along the lateral direction. The product storage columns 12 are each connected to a cam mechanism 13. The cam mechanism 13 has a cam 14 and a link bar 15.

The cam 14 is a substantially discoid member having a hexagonal shaft hole 14*a* in its center. The cam 14 has the shaft hole 14*a* penetrated by a cam rod 16, which is in the shape of a hexagonal column and extends along the vertical direction. The lower end of the cam rod 16 is connected to a motor 17 serving as a driving source through a transmission mechanism (not illustrated). The cam rod 16 rotates around its center axis serving as an axial core with driving of the motor 17. With this configuration, the cam 14 can rotate around the center axis of the cam rod 16 serving as an axial core.

The motor 17 is capable of forward and reverse rotations. With this configuration, the cam 14 can rotate clockwise and counterclockwise around the center axis of the cam rod 16.

The number of cams 14 corresponds to the number of product storage racks 10. Each cam 14 is disposed at the height level of the corresponding product storage rack 10. The cam 14 has a first cam portion 141, a second cam portion 142, and a third cam portion 143.

As illustrated in FIGS. 2 and 3, the first cam portion 141 has its peripheral surface abut on a left-end surface 15*a* of the link bar 15 in a standby state.

The second cam portion 142 is formed successively to the first cam portion 141 and has a portion of a certain size projecting in the radially outward direction of the cam 14 further than the first cam portion 141.

The third cam portion 143 is formed successively to both of the second cam portion 142 and the first cam portion 141 and has a portion of a certain size projecting in the radially outward direction of the cam 14 further than the second cam portion 142.

The cam 14 in this configuration has the peripheral surface of the first cam portion 141 abut on the left-end surface 15*a* of the link bar 15 in a standby state. For example, in FIG. 3, when the cam 14 rotates counterclockwise (forward driving) 120 degrees, the peripheral surface of the second cam portion 142 abuts on the left-end surface 15*a* of the link bar 15. Furthermore, in FIG. 3, when the cam 14 rotates clockwise (reverse driving) 120 degrees from the standby state, the peripheral surface of the third cam portion 143 abuts on the left-end surface 15*a* of the link bar 15.

The link bar 15 is disposed for each product storage rack 10. The link bar 15 is a rod-shape member and is provided in the upper part of the corresponding product storage rack 10 in a manner striding across a plurality of product storage columns 12 configuring the product storage rack 10. The link bar 15 is slidably provided along the lateral direction through a supporting member (not illustrated). The link bar 15 has a plurality of connecting grooves 15*b* for the respective product storage columns 12.

The product storage column 12 configuring the product storage rack 10 will now be described.

Figure 5:
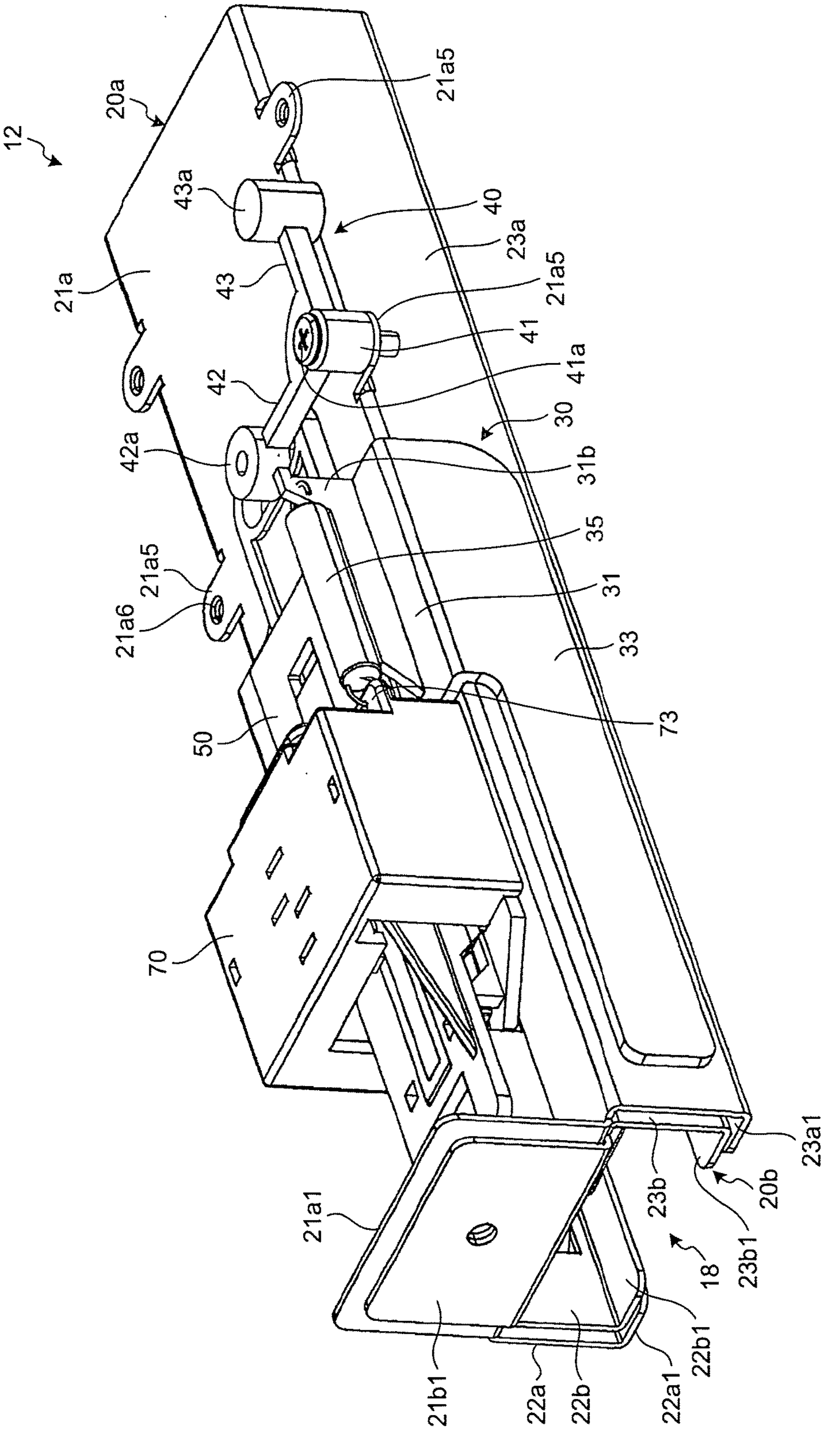
FIG. 5 is a perspective view that illustrates a product storage column configuring the product storage rack illustrated in FIGS. 2 to 4.
Figure 6:
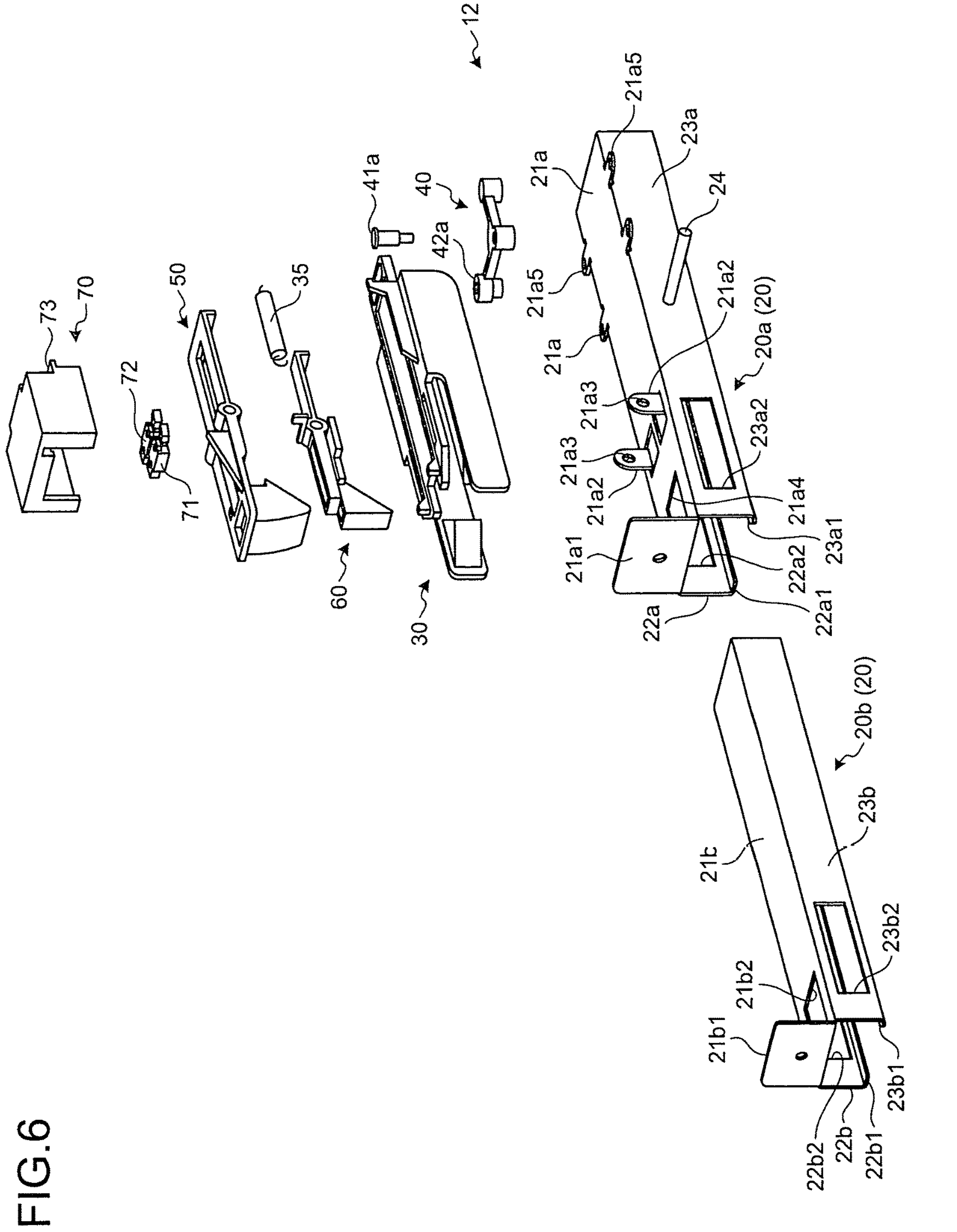
FIG. 6 is a perspective exploded view that illustrates the product storage column configuring the product storage rack illustrated in FIGS. 2 to 4.

FIGS. 5 and 6 illustrate a product storage column configuring the product storage rack illustrated in FIGS. 2 to 4. FIG. 5 is a perspective view, and FIG. 6 is a perspective exploded view. Because the product storage columns 12 configuring the product storage rack 10 have the same configuration, one of the product storage columns 12 will be described.

As FIGS. 5 and 6 illustrate, the product storage column 12 is configured with a rail member 20, a slider 30, a link lever 40, a first gate 50, a second gate 60, and a covering member 70.

The rail member 20 defines a product storage path 18 by extending along the front to rear direction. The rail member 20 is configured with a first rail 20*a* and a second rail 20*b*.

The first rail 20*a* is formed by bending a steel plate as appropriate and is elongated with the front to rear direction corresponding to the longitudinal direction. The first rail 20*a* forms a U-shape that opens in the downward direction in a front view by integrally forming a first rail base 21*a*, a first rail left portion 22*a*, and a first rail right portion 23*a*.

The first rail base 21*a* is a substantially horizontal portion extending along the front to rear direction. The first rail base 21*a* forms, in the front end portion, a first upward extending portion 21*a*1 extending upward. The first upward extending portion 21*a*1 is fixed to the rack rod 11 with a fixing member. Furthermore, the first rail base 21*a* is supported by a supporting member (not illustrated) in the rear end portion.

The first rail base 21*a* has shaft supporting pieces 21*a*2, which are formed in a right-left pair in the shape of a tongue by cutting and bending up certain parts of the first rail base 21*a*. The shaft supporting pieces 21*a*2 each have shaft supporting holes 21*a*3. The shaft supporting holes 21*a*3 are penetrated by a gate shaft 24 in a rod shape. With this configuration, the right-left pair of the shaft supporting pieces 21*a*2 supports the gate shaft 24.

The first rail base 21*a* has a rectangular first gate opening 21*a*4 formed in an area ahead of the shaft supporting pieces 21*a*2. The first rail base 21*a* further has four projecting pieces 21*a*5 in the shape of a tongue projecting toward the right and left in the rear end portion situated behind the shaft supporting pieces 21*a*2.

More specifically, two projecting pieces 21*a*5 projecting toward the right are formed in the right edge portion in the rear end portion of the first rail base 21*a* in a manner aligned in the front to rear direction. Other two projecting pieces 21*a*5 projecting toward the left are formed in the left edge portion in the rear end portion of the first rail base 21*a* in a manner aligned in the front to rear direction. Each of the projecting pieces 21*a*5 has a hole 21*a*6.

The first rail left portion 22*a* extends downward from the left end portion of the first rail base 21*a*. The first rail left portion 22*a* further bends toward the right in the extending end portion, which forms a first left edge end portion 22*a*1. The first rail left portion 22*a* in this configuration forms an L-shape in a front view. In the front end portion of the first rail left portion 22*a*, a rectangular first left stopper opening 22*a*2 is formed with the front to rear direction corresponding to the longitudinal direction.

The first rail right portion 23*a* extends downward from the right end portion of the first rail base 21*a*. The first rail right portion 23*a* further bends toward the left in the extending end portion, which forms a first right edge end portion 23*a*1. The first rail right portion 23*a* in this configuration forms a reverse L-shape in a front view.

In the front end portion of the first rail right portion 23*a*, a first right stopper opening 23*a*2 is formed in a manner facing the first left stopper opening 22*a*2.

The first rail left portion 22*a* and the first rail right portion 23*a* are formed in a right-left pair, and the space formed therebetween defines a part of the product storage path 18. The width (the smallest width between the first left edge end portion 22*a*1 and the first right edge end portion 23*a*1) is larger than the largest width of the neck portion of a product (hereinafter referred to as a large diameter product) having a drinking hole with a larger diameter than that of a target product of the product storage device in this embodiment and is smaller than the largest width of the cap fitting portion of the large diameter product.

The second rail 20*b* is formed by bending a steel plate as appropriate and is elongated with the front to rear direction corresponding to the longitudinal direction. The second rail 20*b* has a lateral width smaller than that of the first rail 20*a*. The second rail 20*b* forms a U-shape that opens in the downward direction in a front view by integrally forming a second rail base 21*b*, a second rail left portion 22*b*, and a second rail right portion 23*b*.

The second rail base 21*b* is a substantially horizontal portion extending along the front to rear direction. The second rail base 21*b* has a second upward extending portion 21*b*1 extending upward in its front end portion. The second rail base 21*b* further has a second gate opening 21*b*2 formed in the same shape and the same size as those of the first gate opening 21*a*4.

The second rail left portion 22*b* extends downward from the left end portion of the second rail base 21*b*. The second rail left portion 22*b* further bends toward the right in the extending end portion, which forms a second left edge end portion 22*b*1. The second rail left portion 22*b* in this configuration forms an L-shape in a front view. In the front end portion of the second rail left portion 22*b*, a second left stopper opening 22*b*2 is formed in the same shape and the same size as those of the first left stopper opening 22*a*2.

The second rail right portion 23*b* extends downward from the right end portion of the second rail base 21*b*. The second rail right portion 23*b* further bends toward the left in the extending end portion, which forms a second right edge end portion 23*b*1. The second rail right portion 23*b* in this configuration forms a reverse L-shape in a front view. In the front end portion of the second rail right portion 23*b*, a second right stopper opening 23*b*2 is formed in a manner facing the second left stopper opening 22*b*2. The second right stopper opening 23*b*2 is formed in the same shape and the same size as those of the first right stopper opening 23*a*2.

The second rail left portion 22*b* and the second rail right portion 23*b* are formed in a right-left pair. The space between the pair defines a part of the product storage path 18. The width (the smallest width between the second left edge end portion 22*b*1 and the second right edge end portion 23*b*1) is larger than the largest width of the neck portion W3 of a product, which is a target product of the product storage device in this embodiment (hereinafter referred to as a small diameter product), having a smaller width than that of the large diameter product. Furthermore, the width is smaller than the largest width of the cap fitting portion W1 of the small diameter product.

The second rail 20*b* in this configuration is inserted into the first rail 20*a* from the front side thereof. The second rail 20*b* is configured such that the second left edge end portion 22*b*1 is disposed on the first left edge end portion 22*a*1, the second right edge end portion 23*b*1 is disposed on the first right edge end portion 23*a*1, and the second upward extending portion 21*b*1 is fixed to the rack rod 11 by a fixing member with the first upward extending portion 21*a*1 interposed therebetween. The second gate opening 21*b*2 fits with the first gate opening 21*a*4, the second left stopper opening 22*b*2 fits with the first left stopper opening 22*a*2, and the second right stopper opening 23*b*2 fits with the first right stopper opening 23*a*2.

The rail member 20 in this configuration needs the second rail 20*b* when the small diameter product is adopted as a target product as in the case of this embodiment. Conversely, the second rail 20*b* is not necessary when the large diameter product is adopted as a target product. In the case with the large diameter product as the target product, the rail member 20 is configured with the first rail 20*a* alone.

With the rail member 20, when a product is loaded in an upright position in such a manner that the neck portion W3 of the product is inserted into the product storage path 18 from the front side thereof, a part of the cap fitting portion W1 of the product is placed on the second left edge end portion 22*b*1 and the second right edge end portion 23*b*1. With this configuration, the rail member 20 supports the product in a hanging position by supporting the cap fitting portion W1 of the product. Furthermore, the rail member 20 stores the product in the product storage path 18 in a manner aligning the product along the front to rear direction. The rail member 20 is installed in a manner gradually inclining downward in the frontward direction. With this configuration, the product is stored in the product storage path 18 in a manner movable frontward using its own weight.

Figure 7:
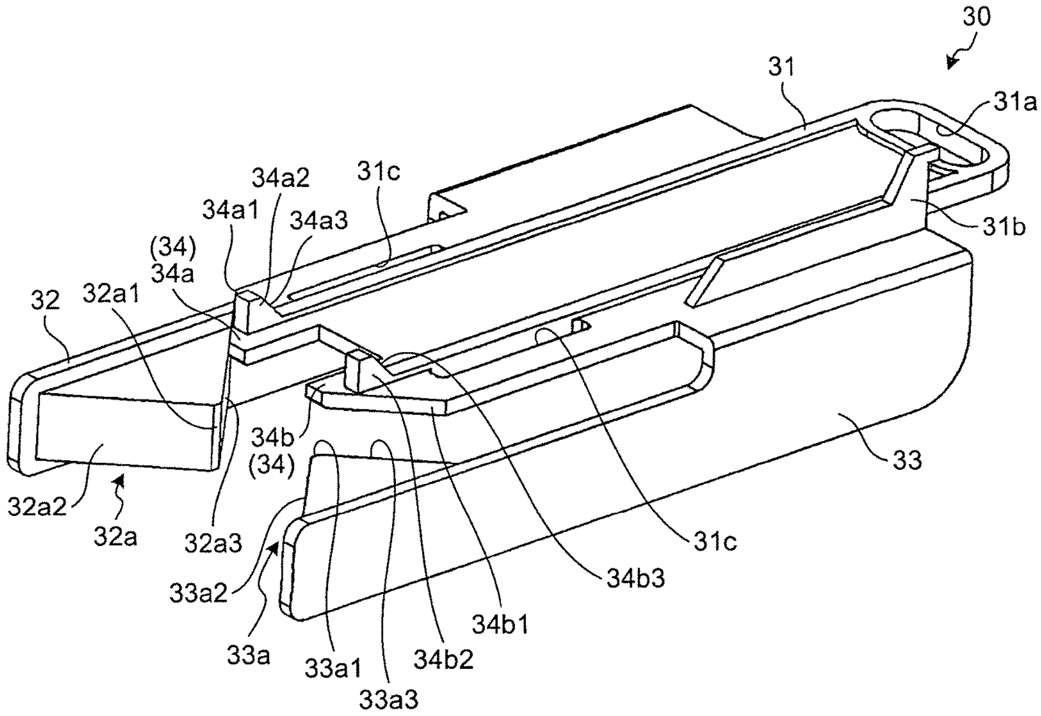
FIG. 7 is a perspective view that illustrates a slider illustrated in FIGS. 5 and 6.

FIG. 7 is a perspective view that illustrates a slider illustrated in FIGS. 5 and 6. The slider 30 is formed, for example, by processing a resin material. The slider 30 forms a U-shape that opens in the downward direction in a front view with a slider base 31, a slider left portion 32, and a slider right portion 33 integrally formed.

The slider base 31 is a horizontal extending portion that extends along the front to rear direction. The lateral width of the slider base 31 is larger than that of the first rail base 21*a*, and the slider base 31 has a connecting hole 31*a*, a catching projecting portion 31*b*, and forward projecting pieces 34. The connecting hole 31*a* is a long hole formed in the rear end portion of the slider base 31 with the right to left direction corresponding to the longitudinal direction.

The catching projecting portion 31*b* is formed in the right side in the rear end portion of the slider base 31 in a manner projecting upward. The catching projecting portion 31*b*, which will be described later in detail, catches a slider spring 35 at its rear end portion. The forward projecting pieces 34 are bifurcate portions in a right-left pair formed in the front end portion of the slider base 31 in a manner projecting forward.

A left forward projecting piece 34*a* of the forward projecting pieces 34 has an inclination 34*a*1 gradually inclining toward the left in the backward direction. On the upper surface of the left forward projecting piece 34*a*, a left forward projecting portion 34*a*2 is formed in a manner projecting upward. The left forward projecting portion 34*a*2 has an inclination 34*a*3 gradually inclining downward toward the backward direction.

A right forward projecting piece 34*b* has an inclination 34*b*1 gradually inclining toward the right in the backward direction. On the upper surface of the right forward projecting piece 34*b*, a right forward projecting portion 34*b*2 is formed in a manner projecting upward. The right forward projecting portion 34*b*2 forms a right-left pair with the left forward projecting portion 34*a*2 and has an inclination 34*b*3 gradually inclining downward in the backward direction.

The slider left portion 32 is a portion extending downward from the left end portion in the rear end portion of the slider base 31. The slider left portion 32 extends along the front to rear direction with its front end portion positioned ahead of the forward projecting pieces 34 of the slider base 31. A left stopper 32*a* projecting toward the right is formed on the right side surface in the front end portion, which is an area ahead of the forward projecting pieces 34, of the slider left portion 32. The left stopper 32*a* is in a triangle shape in a top view. The left stopper 32*a* has an inclination 32*a*2 gradually inclining to the left from a vertex 32*a*1 of the left stopper 32*a* toward the frontward direction and has another inclination 32*a*3 gradually inclining toward the left from the vertex 32*a*1 in the backward direction.

The slider right portion 33 is a portion extending downward from the right end portion in the rear end portion of the slider base 31. The slider right portion 33 extends along the front to rear direction with its front end portion positioned ahead of the forward projecting pieces 34 of the slider base 31. A right stopper 33*a* projecting toward the left is formed on the left side surface in the front end portion, which is an area ahead of the forward projecting pieces 34, of the slider right portion 33. The right stopper 33*a* is in a triangle shape in a top view. The right stopper 33*a* has an inclination 33*a*2 gradually inclining to the right from a vertex 33*a*1 of the right stopper 33*a* in the frontward direction and has another inclination 33*a*3 gradually inclining toward the right from the vertex 33*a*1 in the backward direction.

The slider left portion 32 and the slider right portion 33 are in a right-left pair. The distance between the vertex 32*a*1 of the left stopper 32*a* and the vertex 33*a*1 of the right stopper 33*a* is smaller than the lateral width of the cap fitting portion W1 of a target product (a small diameter product).

As FIG. 5 illustrates, the slider 30 in this configuration is disposed in such a manner that the slider base 31 is placed on the upper surface of the first rail base 21*a* of the rail member 20 (the first rail 20*a*), the left stopper 32*a* penetrates the first left stopper opening 22*a*2 and the second left stopper opening 22*b*2 to enter the product storage path 18, and the right stopper 33*a* penetrates the first right stopper opening 23*a*2 and the second right stopper opening 23*b*2 to enter the product storage path 18. The shaft supporting pieces 21*a*2 of the first rail base 21*a* penetrate respective long holes 31*c* of the slider base 31.

The link lever 40 is formed, for example, by processing a resin material and is configured with a link base 41, a first link arm 42, and a second link arm 43 integrally formed. The link base 41 is in a cylindrical shape. The link base 41 is placed on the upper surface of the right front projecting piece 21_a_5 of the rail member 20 (the first rail 20_a_) with a link shaft 41_a_, which penetrates a hollow portion, inserted into the hole 21_a_6 of the right front projecting piece 21_a_5. With this configuration, the link lever 40 can rotate around the center axis of the link shaft 41_a_, which serves an axis core for rotation.

The first link arm 42 extends in the radially outward direction of the link base 41 from the peripheral surface of the link base 41 and has a first connecting portion 42_a_ on its end. The first connecting portion 42_a_ is in a stepped cylindrical shape with a small diameter portion and a large diameter portion successively formed (see FIG. 6). The small diameter portion of the first connecting portion 42_a_ is inserted into the connecting hole 31_a_ of the slider 30 from above, whereby the link lever 40 is connected to the slider 30 through the first link arm 42.

The second link arm 43 extends in the radially outward direction of the link base 41 from the peripheral surface of the link base 41 in a manner perpendicular to the first link arm 42 and has a cylindrical second connecting portion 43_a_ on its end. The second connecting portion 43_a_ is disposed in a corresponding connecting groove 15_b_ of the link bar 15. With this configuration, the link lever 40 is connected to the link bar 15 through the second link arm 43. In this manner, the slider 30 and the cam mechanism 13 are coupled through the link lever 40.

Figure 8:
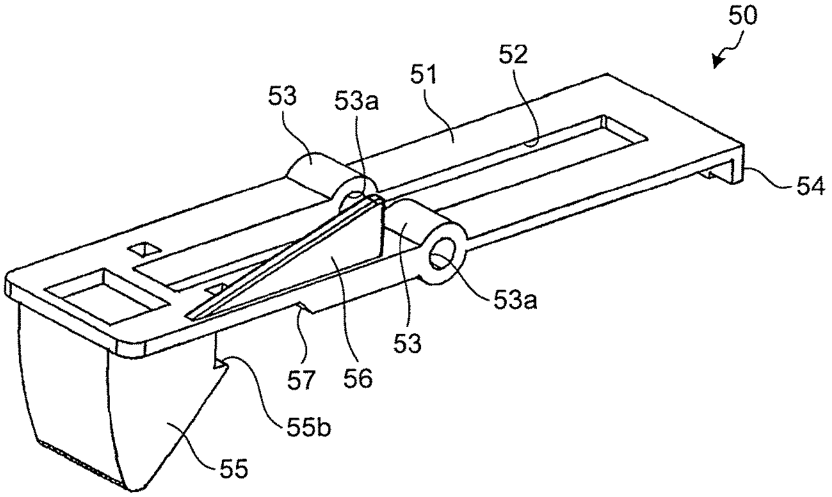
FIG. 8 is a perspective view that illustrates a first gate illustrated in FIGS. 5 and 6.

FIG. 8 is a perspective view that illustrates a first gate illustrated in FIGS. 5 and 6. The first gate 50 is formed by, for example, processing a resin material. The first gate 50 has a first gate base 51 elongated with the front to rear direction corresponding to the longitudinal direction. The first gate base 51 has a gate inserting hole 52, first shaft supporting portions 53, a first abutting downward extending portion 54, a first gate projecting portion 55, a first pressing piece 56, and a first gate inclination 57.

The gate inserting hole 52 is in a rectangular shape formed in the central area of the first gate base 51 with the front to rear direction corresponding to the longitudinal direction. The first shaft supporting portions 53 are formed in the substantially central area in the front to rear direction of the first gate base 51 in a manner separated into the left and right parts with the gate inserting hole 52 interposed therebetween. Each of the first shaft supporting portions 53 has a through hole 53_a_ penetrated by the gate shaft 24.

The first abutting downward extending portion 54, which is formed by bending the rear end portion of the first gate base 51 downward, extends downward. The first gate projecting portion 55 is formed in a manner projecting downward from the bottom surface in the front end portion of the first gate base 51. A gate groove 55_a_ (see FIG. 13, for example) is formed in the rear center portion of the first gate projecting portion 55. In the rear edge portion of the first gate projecting portion 55, a catching portion 55_b_ is formed in such a manner that it gradually inclines to the back from the end portion of the first gate projecting portion 55 in the upward direction and then subsequently extends forward.

The first pressing piece 56 is vertically formed on the upper surface of the first gate base 51, specifically, in a position in front of the first shaft supporting portion 53 and on the right side of the gate inserting hole 52. The upper surface of the first pressing piece 56 forms an inclination gradually inclining upward in the backward direction.

The first gate inclination 57 is formed on the bottom surface of the first gate base 51, specifically, in a position in front of the first shaft supporting portion 53 and behind the first gate projecting portion 55. The first gate inclination 57 gradually inclines to the back in the downward direction.

Figure 9:
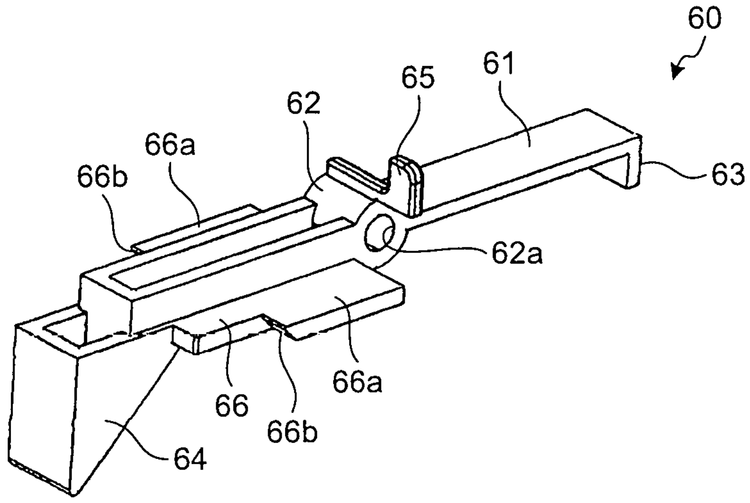
FIG. 9 is a perspective view that illustrates a second gate illustrated in FIGS. 5 and 6.

FIG. 9 is a perspective view that illustrates a second gate illustrated in FIGS. 5 and 6. The second gate 60 is formed by, for example, processing a resin material. The second gate 60 has a second gate base 61 elongated with the front to rear direction corresponding to the longitudinal direction. The second gate base 61 has respective lengths in the front to rear direction and in the right to left direction adjusted in the size insertable into the gate inserting hole 52 of the first gate 50. The second gate base 61 has a second shaft supporting portion 62, a second abutting downward extending portion 63, a second gate projecting portion 64, a second pressing piece 65, and an increased width portion 66.

The second shaft supporting portion 62 is formed in the substantially central area in the front to rear direction of the second gate base 61 and has a through hole 62_a_ penetrated by the gate shaft 24.

The second abutting downward extending portion 63, which is formed by bending the rear end portion of the second gate base 61 downward, extends downward. The second gate projecting portion 64 is formed in a manner extending forward from the front end portion of the second gate base 61 and projects downward. The second gate projecting portion 64 has a size insertable into the gate groove 55_a_.

The second pressing piece 65 is formed on the second shaft supporting portion 62 in a manner projecting toward the right further than the second shaft supporting portion 62.

The increased width portion 66 is in a shape of a flat board and is formed in a manner projecting toward the right and left from the bottom part of the second gate base 61 in front of the second shaft supporting portion 62. The lateral width of the increased width portion 66 is larger than that of the second gate base 61 and is accordingly larger than the lateral width of the gate inserting hole 52 of the first gate 50. The front end portion of the increased width portion 66 is formed successively to the side surface of the second gate projecting portion 64. Furthermore, a projecting portion 66_a_ projecting toward the right and left is formed in both edge portions formed from the central portion to the rear end portion in the front to rear direction of the increased width portion 66. A front end surface 66_b_ of the projecting portion 66_a_ is an inclination that gradually inclines to the back in the downward direction. The front end surface 66_b_ of the projecting portion 66_a_ may hereinafter be referred to as a second gate inclination 66_b_.

The second gate 60 in this configuration is relatively made close to the first gate 50 from below, and the second gate base 61 is inserted into the gate inserting hole 52 from below. The through hole 62_a_ of the second shaft supporting portion 62 and the through holes 53_a_ of the first shaft supporting portion 53 are accordingly aligned with one another in a straight line. Furthermore, the second gate projecting portion 64 enters the gate groove 55_a_ of the first gate projecting portion 55. With this arrangement, because the increased width portion 66 of the second gate 60 has a larger lateral width than that of the gate inserting hole 52, the upper surface of the increased width portion 66 abuts on the bottom surface of the first gate base 51.

Figure 10:
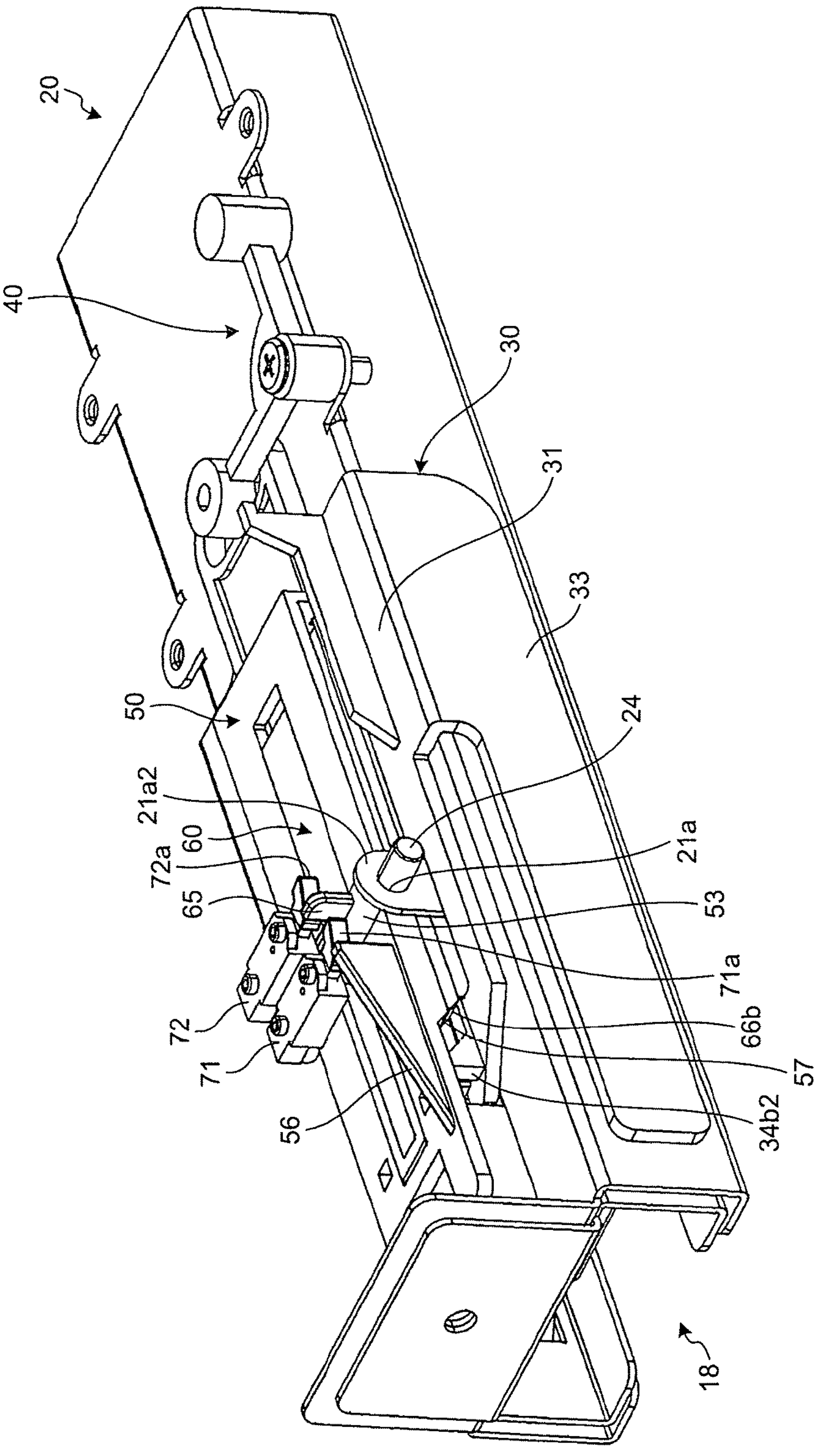
FIG. 10 is a perspective view that illustrates a state in which a covering member is removed from the product storage column illustrated in FIG. 5.

As FIG. 10 illustrates, the first gate 50 and the second gate 60 are placed on the upper surface of the slider base 31 of the slider 30. The through holes 53_a_ of the first shaft supporting portion 53, the through hole 62_a_ of the second shaft supporting portion 62, and the shaft supporting holes 21_a_3 formed on the shaft supporting pieces 21_a_2, which penetrate the long holes 31*c* of the slider base 31, of the first rail 20*a* are aligned with one another in a straight line. The gate shaft 24 penetrates the through holes 53*a*, the through hole 62*a*, and the shaft supporting holes 21*a*3. With this configuration, the second gate 60 is connected to the first gate 50.

In this configuration, the end surface of the first abutting downward extending portion 54 of the first gate 50 and the end surface of the second abutting downward extending portion 63 of the second gate 60 abut on the upper surface of the slider base 31 of the slider 30. The first gate 50 and the second gate 60 are in the state of having moved forward so that the first gate projecting portion 55 and the second gate projecting portion 64 move into the product storage path 18 through the first gate opening 21*a*4 and the second gate opening 21*b*2. Specifically, the second gate 60 is positioned in the back of the first gate 50 in the upstream direction of the product storage path 18.

The first gate projecting portion 55 and the second gate projecting portion 64 having moved into the product storage path 18 have respective end portions positioned in front of the vertex 32*a*1 of the left stopper 32*a* and the vertex 33*a*1 of the right stopper 33*a*.

In this arrangement, the first gate inclination 57 of the first gate 50 is continuous with the second gate inclination 66*b*.

The covering member 70 is disposed on the first rail 20*a* in a manner covering the periphery of the shaft supporting pieces 21*a*2 of the first rail 20*a*. The covering member 70 holds both ends of the gate shaft 24 projecting toward the right and left from the shaft supporting pieces 21*a*2 and has a first sensor 71 and a second sensor 72 arranged at certain positions as illustrated in FIG. 10.

The first sensor 71 is provided with a first contact 71*a* in a swingable manner, and the first contact 71*a* is pressed by a first sensor spring (not illustrated). The first sensor 71 is a detector that is in the off-state when the first contact 71*a* is pressed by the first sensor spring and stays in a standard position. The first sensor 71 turns to the on-state when the first contact 71*a* pushes back the first sensor spring against the spring force thereof and swings. The first sensor 71 thereafter sends an on-signal to the control unit 80.

The second sensor 72 is provided with a second contact 72*a* in a swingable manner, and the second contact 72*a* is pressed by a second sensor spring (not illustrated). The second sensor 72 is a detector that is in the off-state when the second contact 72*a* is pressed by the second sensor spring and stays in a standard position. The second sensor 72 turns to the on-state when the second contact 72*a* pushes back the second sensor spring against the spring force thereof and swings. The second sensor 72 thereafter sends an on-signal to the control unit 80.

The first sensor 71 is installed with the first contact 71*a* positioned in the back of the first pressing piece 56. The second sensor 72 is installed with the second contact 72*a* positioned in the back of the second pressing piece 65.

The covering member 70 has a spring catching portion 73 projecting backward. An end of the slider spring 35 is caught by the spring catching portion 73, and the other end of the slider spring 35 is caught by the rear end portion of the catching projecting portion 31*b* of the slider 30. With this configuration, the slider 30 is pressed by the slider spring 35 in the frontward direction in a manner approaching the covering member 70.

Figure 11:
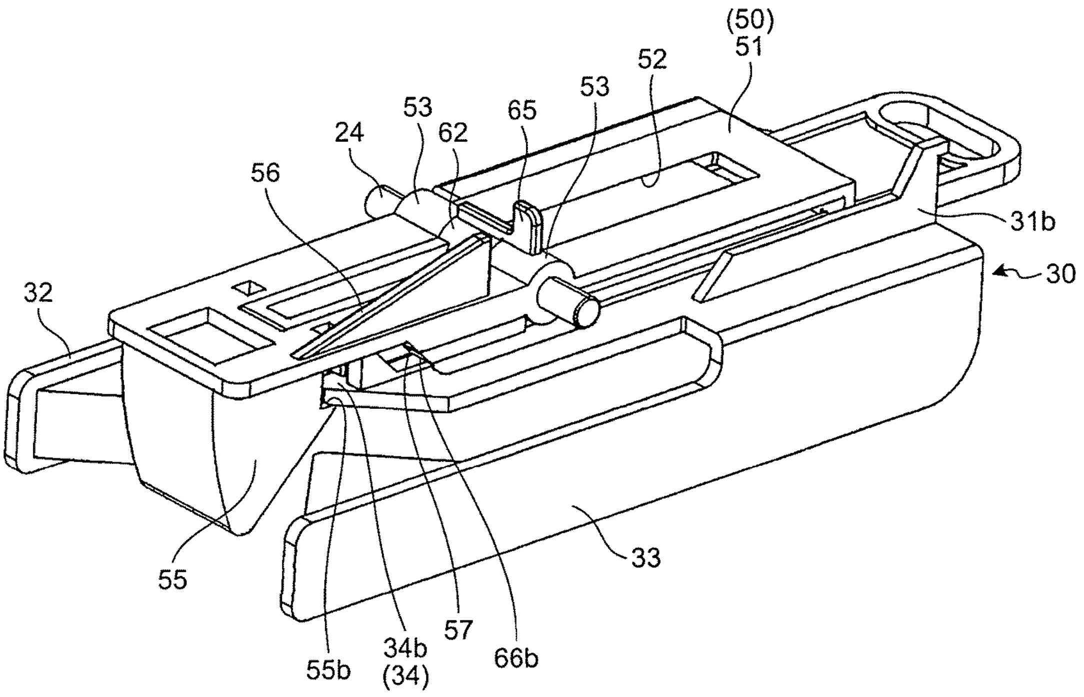
FIG. 11 is a perspective view that illustrates the positional relation between the slider, the first gate, and the second gate illustrated in FIGS. 5 and 6.

When the slider 30 is pressed by the slider spring 35 in the frontward direction, as FIG. 11 illustrates, the forward projecting pieces 34 of the slider 30 are positioned on the upper surface of the catching portion 55*b* of the first gate 50. This configuration restricts the first gate 50 to move back from the product storage path 18. With the first gate 50 restricted to move back from the product storage path 18, the second gate 60, which has the increased width portion 66 abutting the first gate base 51, is also restricted to move back from the product storage path 18. Furthermore, the left forward projecting portion 34*a*2 and the right forward projecting portion 34*b*2 of the slider 30 are separated from the first gate inclination 57 and the second gate inclination 66*b*.

FIG. 12 is a block diagram that schematically illustrates a characteristic control system of the above-described product storage device. As FIG. 12 illustrates, the product storage device has a door opening and closing sensor 75 and the control unit 80.

The door opening and closing sensor 75 detects opening and closing of the outer door 2. When the outer door 2 is closed, the door opening and closing sensor 75 turns to the-off state and sends a close signal to the control unit. When the outer door 2 is opened, the door opening and closing sensor 75 turns to the on-state and sends an open signal to the control unit 80.

The control unit 80 performs an overall control on the operation of the product storage device based on programs and data stored in a memory 90. The control unit 80 includes an input processing unit 81, a communication processing unit 82, a measuring processing unit (counter) 83, a charging processing unit 84, a display processing unit 85, a motor driving processing unit 86, and a lock driving processing unit 87.

The input processing unit 81 inputs signals output from various kinds of sensors including the first sensor 71, a signal output from the replenishment button 6 (the replenishment switch 6*a*), and information read by the card reader 4. The communication processing unit 82 sends and receives data to and from a management center 100. The management center 100 in this embodiment is, for example, a server of a company processing credit card transactions.

The measuring processing unit 83 counts the number of products taken out from the product storage device based on results of detection by the first sensor 71 and the second sensor 72. The charging processing unit 84 performs charging processing based on the number of products counted by the measuring processing unit 83 and the price of the taken out product.

The display processing unit 85 gives a display command to the display unit 5 and has the display unit 5 display various kinds of information. The motor driving processing unit 86 gives a driving command or a driving stop command to the motor 17 and has the motor 17 drive or stop driving. The lock driving processing unit 87 gives a lock command or unlock command to the lock mechanism 3 and makes the lock mechanism 3 in the locked state or unlocked state.

The operation of the product storage device with the above-described configuration will now be described. For convenience of description, one of product storage columns 12 of one of product storage racks 10 configuring the product storage device will be described.

Figure 13:
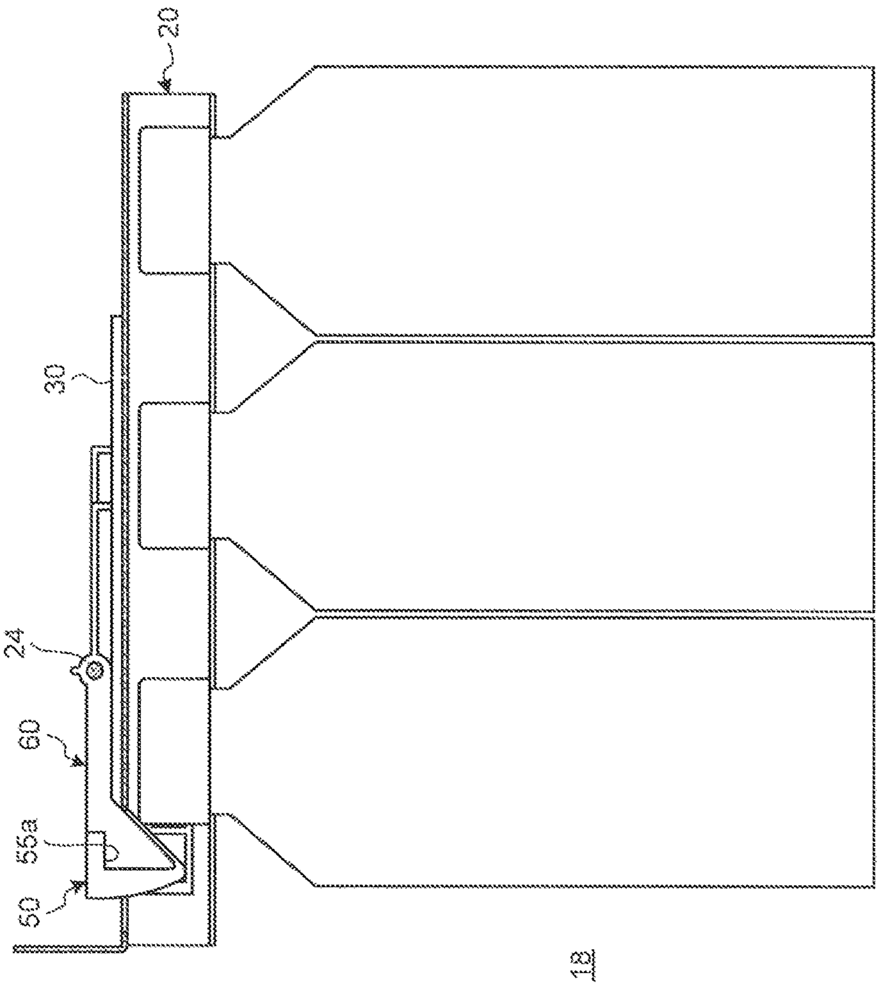
FIG. 13 is an illustrative drawing that schematically illustrates the product storage column in a standby state in FIG. 5 and other drawings from the right side.

FIG. 13 is an illustrative drawing that schematically illustrates the product storage column in a standby state in FIG. 5 and others. In the standby state, as FIG. 13 illustrates, the first gate 50 and the second gate 60 are restricted to move back from the product storage path 18 with the forward projecting pieces 34 of the slider 30 positioned on the upper surface of the catching portion 55*b* of the first gate 50. Because the first gate 50 and the second gate 60 are restricted to move back from the product storage path 18, a product stored in the product storage path 18 in a hung state cannot be moved frontward, which therefore restricts the product to be taken out. The forefront product disposed in the forefront is stored in a position behind the space between the vertex 32*a*1 of the left stopper 32*a* and the vertex 33*a*1 of the right stopper 33*a*.

Figure 14:
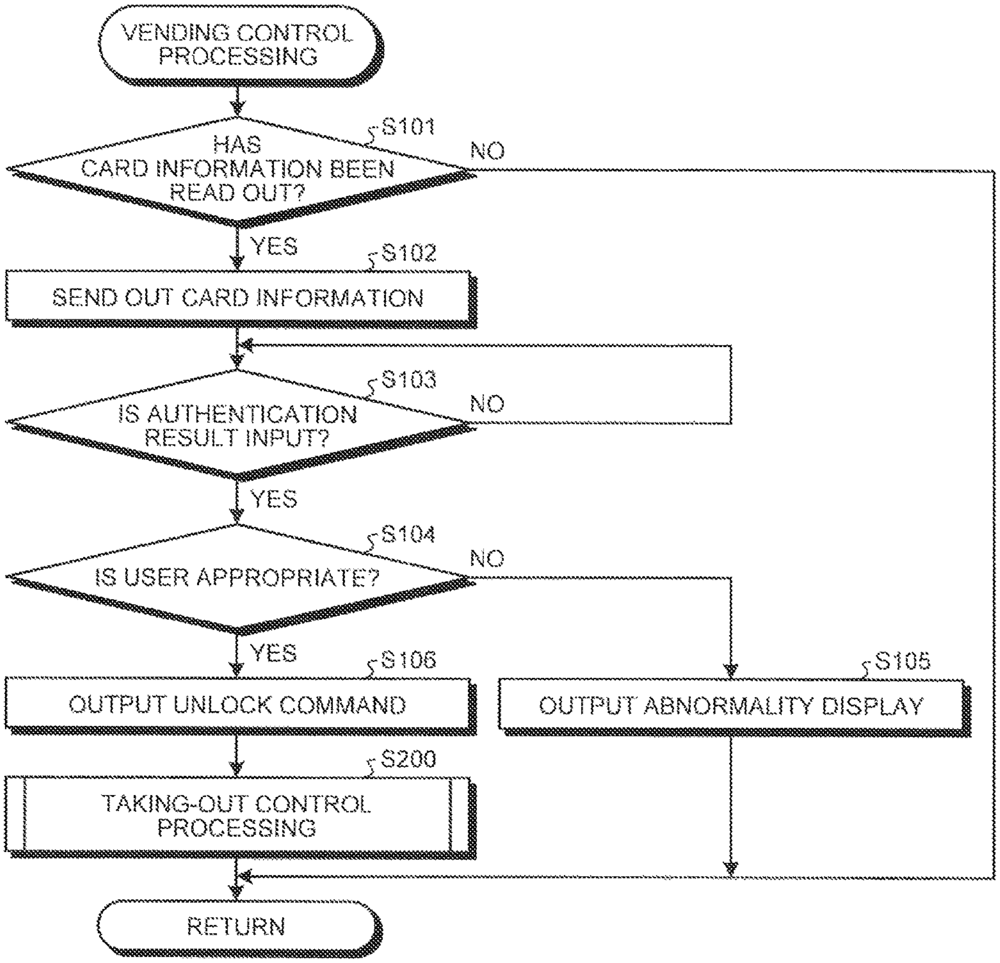
FIG. 14 is a flowchart that illustrates contents of vending control processing performed by the control unit illustrated in FIG. 12.

FIG. 14 is a flowchart that illustrates contents of vending control processing performed by the control unit illustrated in FIG. 12.

In the vending control processing, when credit card identification information (hereinafter referred to as card information) is input through the input processing unit 81 (Yes at Step S101) with the credit card inserted through a card insertion hole 4*a* and the card reader 4 reading the card information, the control unit 80 sends the card information to the management center 100 through the communication processing unit 82 (Step S102).

After sending the card information to the management center 100, the control unit 80 waits for a reply on an authentication result from the management center 100 (Step S103). The management center 100 inputs the authentication result through the communication processing unit 82 (Yes at Step S103). If the authentication result indicates that the user is not appropriate (No at Step S104), the control unit 80 outputs an abnormality display to the display unit 5 through the display processing unit 85 (Step S105) and has the display unit 5 display the message that the credit card cannot be used. The control unit 80 thereafter returns the procedure and ends this processing.

Through the display unit 5, the processing can let the user know that the credit card, which he/she has inserted from the card insertion hole 4*a*, cannot be used and encourage the user to use another credit card.

The management center 100 inputs the authentication result through the communication processing unit 82 (Yes at Step S103), and if the authentication result indicates that the user is appropriate (Yes at Step S104), the control unit 80 outputs an unlock command to the lock mechanism 3 through the lock driving processing unit 87 (Step S106) and turns the lock mechanism 3 to an unlock state. When the control unit 80 outputs the lock-releasing command to the lock mechanism 3, the control unit 80 subsequently performs taking-out control processing (Step S200).

Figure 15:
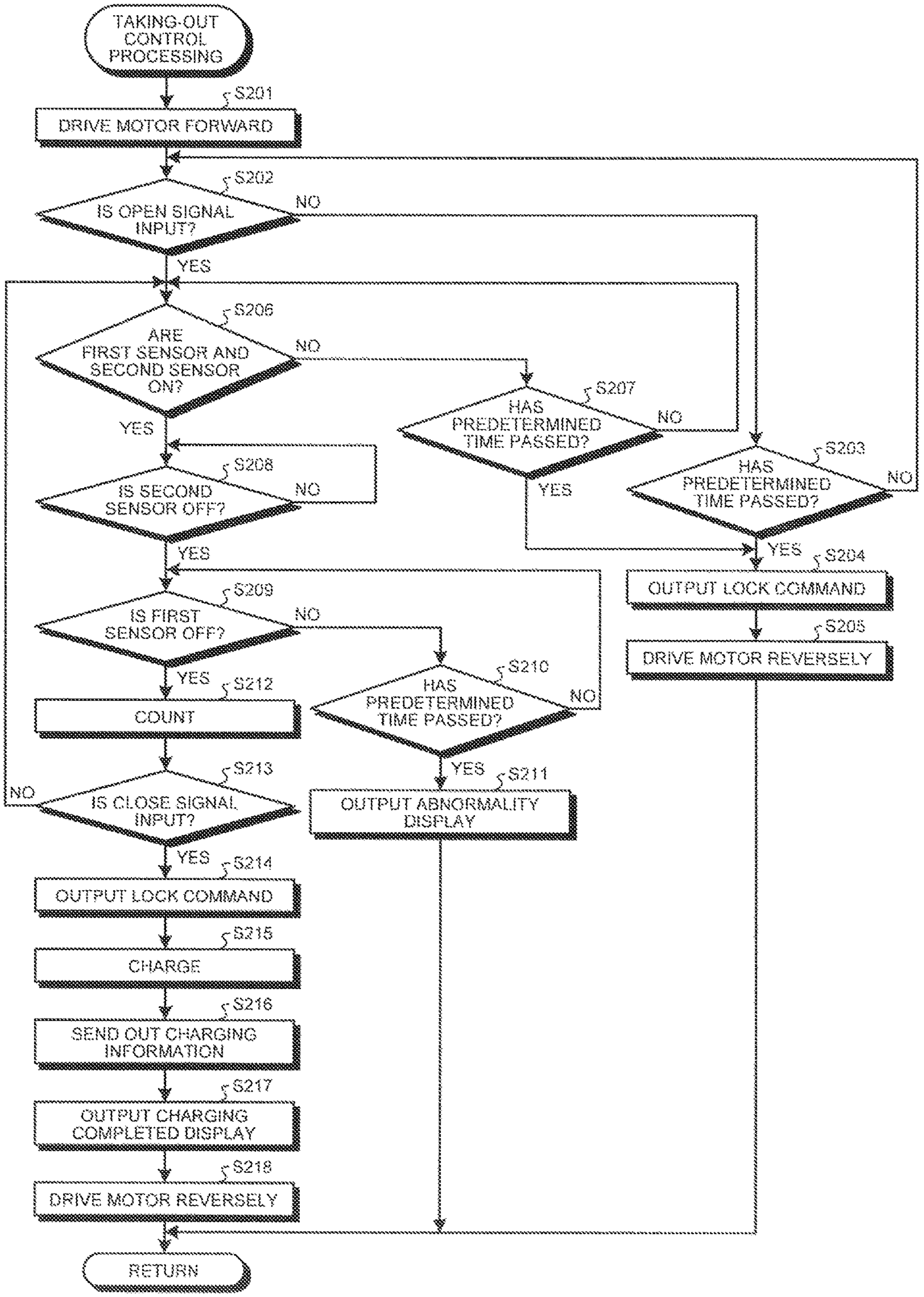
FIG. 15 is a flowchart that illustrates contents of taking-out control processing in the vending control processing illustrated in FIG. 14.

FIG. 15 is a flowchart that illustrates contents of the taking-out control processing in the vending control processing illustrated in FIG. 14.

In the taking-out control processing, the control unit 80 gives a driving command to the motor 17 through the motor driving processing unit 86 and has the motor 17 drive forward (Step S201). Specifically, the control unit 80 has the motor 17 rotate counterclockwise by 120 degrees in FIG. 3.

With the forward driving of the motor 17, the peripheral surface of the second cam portion 142 of the cam 14 abuts on the left-end surface 15*a* of the link bar 15. With this arrangement, the link bar 15 moves a certain distance (for example, about 5 mm) toward the right. When the link bar 15 moves toward the right, the link lever 40 having the second connecting portion 43*a* disposed in the connecting groove 15*b* of the link bar 15 rotates around the center axis of the link shaft 41*a*. Specifically, the link lever 40 rotates clockwise by a certain angular distance in FIG. 3.

Figure 16:
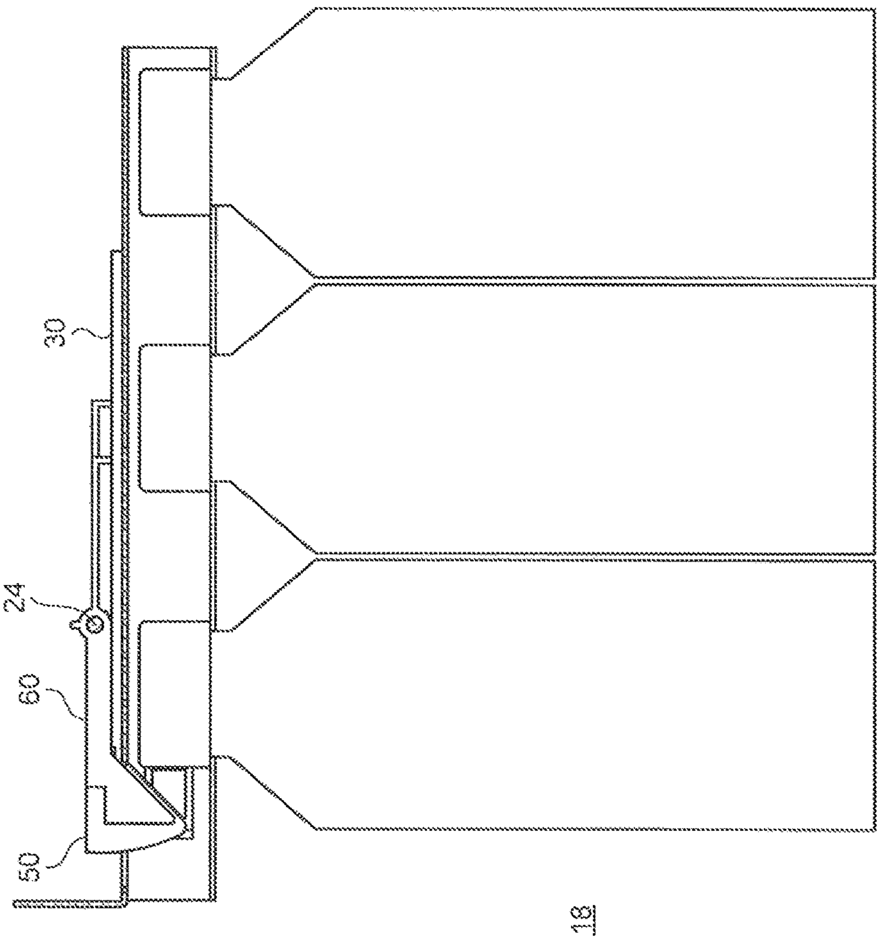
FIG. 16 is an illustrative drawing that schematically illustrates the product storage column from the right side.

With the rotation of the link lever 40, the slider 30 having a connecting hole 31*a* in which the first connecting portion 42*a* of the link lever 40 is disposed slides in the backward direction against the spring force of the slider spring 35 as FIG. 16 illustrates.

With the sliding move of the slider 30 in the backward direction, the forward projecting pieces 34 of the slider 30 are separated from the upper surface of the catching portion 55*b* of the first gate 50. This process consequently releases the first gate 50 and the second gate 60 from the state restricted to move back from the product storage path 18. In this timing, the left forward projecting portion 34*a*2 and the right forward projecting portion 34*b*2 of the slider 30 are still separated from the first gate inclination 57 and the second gate inclination 66*b*.

The control unit 80 having the motor 17 drive forward thereafter waits for an open signal input from the door opening and closing sensor 75 through the input processing unit 81 until a predetermined time passes (Step S202 and Step S203).

If no open signals are input from the door opening and closing sensor 75 through the input processing unit 81 by the end of the predetermined time (No at Step S202 and Yes at Step S203), in other words, if the outer door 2 is not opened by the end of the predetermined time, the control unit 80 outputs a lock command to the lock mechanism 3 through the lock driving processing unit 87 (Step S204) and turns the lock mechanism 3 to a locked state.

The control unit 80 gives a driving command to the motor 17 through the motor driving processing unit 86 and has the motor 17 drive reversely (Step S205). The control unit 80 thereafter returns the procedure and ends this taking-out control processing.

With this processing, the motor 17 is rotated clockwise by 120 degrees in FIG. 3, whereby the peripheral surface of the first cam portion 141 of the cam 14 faces the left-end surface 15*a* of the link bar 15. The link bar 15 accordingly moves a certain distance (for example, about 5 mm) toward the left. Consequently, the device returns to a standby state as illustrated in FIGS. 2 to 4. With the sliding move of the slider 30 in the frontward direction, the forward projecting pieces 34 are positioned on the upper surface of the catching portion 55*b* of the first gate 50. This configuration restricts the first gate 50 and the second gate 60 to move back from the product storage path 18.

If the open signal is input from the door opening and closing sensor 75 through the input processing unit 81 during the predetermined time (Yes at Step S202 and No at Step S203), in other words, if the outer door 2 is opened by the end of the predetermined time, the control unit 80 waits for an on-signal input from the first sensor 71 and the second sensor 72 through the input processing unit 81 until the predetermined time passes (Step S206 and Step S207).

If no on-signals are input from the first sensor 71 or the second sensor 72 through the input processing unit 81 by the end of the predetermined time (No at Step S206 and Yes at Step S207), the control unit 80 performs the above-described processing at Step S204 and Step S205. The control unit 80 thereafter returns the procedure and ends this taking-out control processing.

Figure 17:
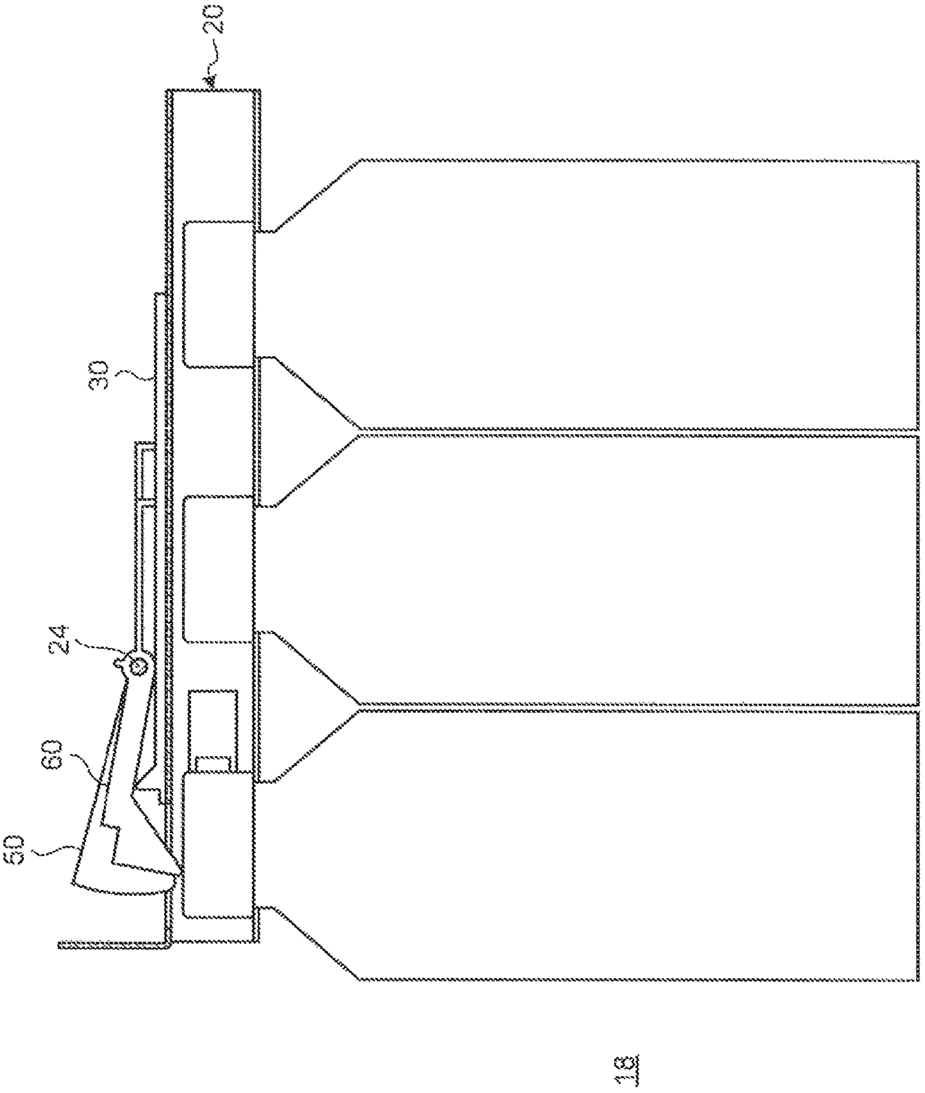
FIG. 17 is another illustrative drawing that schematically illustrates the product storage column from the right side.

As FIG. 17 illustrates, when the forefront product is taken out in the frontward direction, the slider left portion 32 and the slider right portion 33 of the slider 30 are elastically deformed so that the separation distance between the vertex 32*a*1 of the left stopper 32*a* and the vertex 33*a*1 of the right stopper 33*a* is larger than the lateral width of the cap fitting portion of the target product (the small diameter product). After the forefront product passes through, with the resilience of the slider left portion 32 and the slider right portion 33, the separation distance between the vertex 32*a*1 of the left stopper 32*a* and the vertex 33*a*1 of the right stopper 33*a* becomes smaller than the lateral width of the cap fitting portion of the target product (the small diameter product). This configuration restricts a product positioned behind the forefront product to move forward, with its own weight, to a position ahead of the space between the vertex 32*a*1 of the left stopper 32*a* and the vertex 33*a*1 of the right stopper 33*a*.

In this manner, when the product taken out in the frontward direction abuts on the first gate projecting portion 55 and the second gate projecting portion 64, the first gate 50 and the second gate 60 move back so that the first gate projecting portion 55 and the second gate projecting portion 64 are separated from the product storage path 18. Specifically, because the end surface of the first abutting downward extending portion 54 of the first gate 50 abuts on the upper surface of the slider base 31 of the slider 30 and the end surface of the second abutting downward extending portion 63 of the second gate 60 abuts on the upper surface of the slider base 31, the first gate 50 and the second gate 60 are elastically deformed and move back.

When the first gate 50 and the second gate 60 have moved back, the first pressing piece 56 of the first gate 50 presses the first contact 71*a* of the first sensor 71, and the second pressing piece 65 of the second gate 60 presses the second contact 72*a* of the second sensor 72. The first contact 71*a* swings from its standard position against the spring force of the first sensor spring, and the second contact 72*a* swings from its standard position against the spring force of the second sensor spring. Each of the first sensor 71 and the second sensor 72 accordingly outputs an on-signal.

When the on-signals are input from the first sensor 71 and the second sensor 72 through the input processing unit 81 during the predetermined time (Yes at Step S206 and No at Step S207), the control unit 80 waits for an off-signal input from the second sensor 72 (Step S208).

Figure 18:
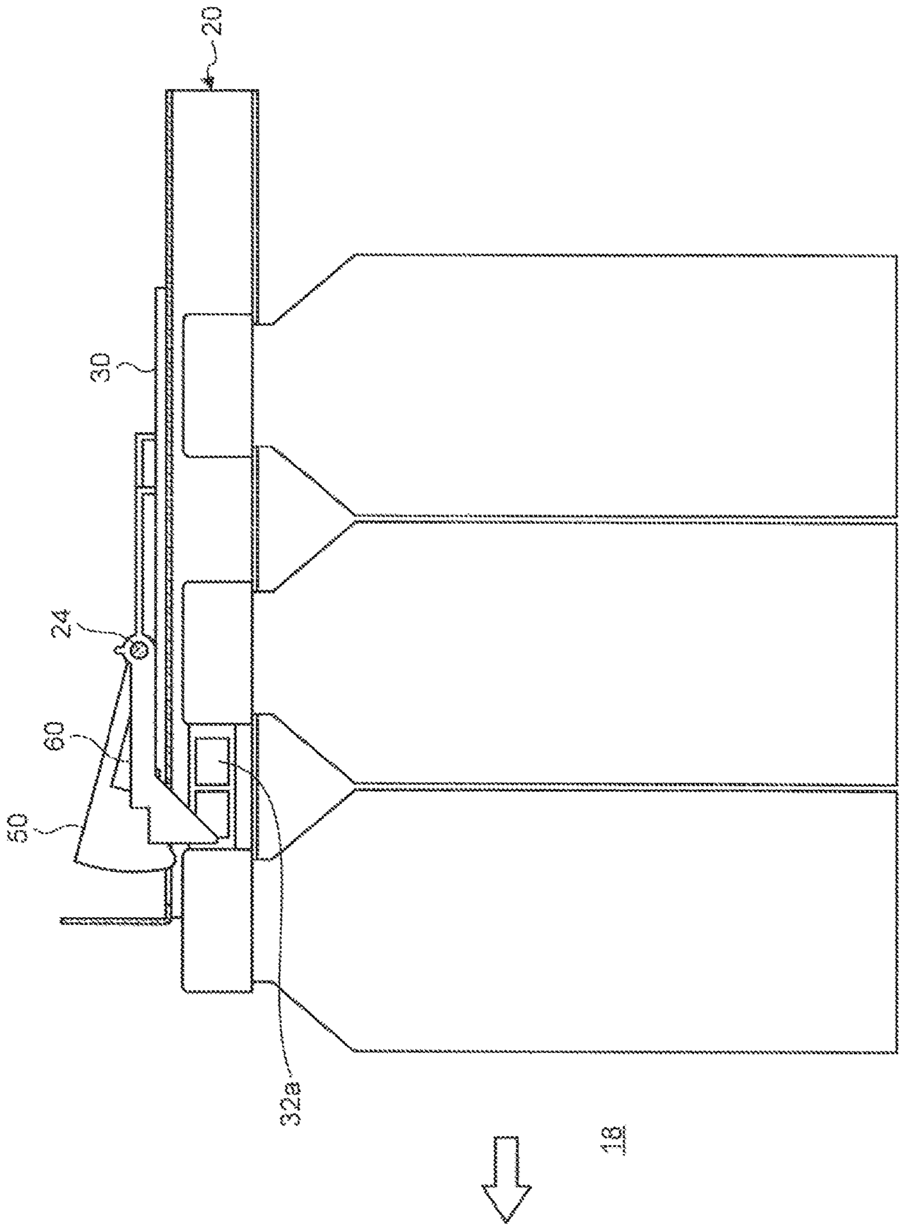
FIG. 18 is still another illustrative drawing that schematically illustrates the product storage column from the right side.

As FIG. 18 illustrates, because the forefront product passes through the second gate 60, which is disposed behind the first gate 50, earlier than the first gate 50, the second gate 60 moves forward with its resilience so that the second gate projecting portion 64 moves into the product storage path 18. The configuration in which the second gate 60 moves forward prior to the first gate 50 prevents the forefront product having been taken out from returning to the product storage path 18.

The forward movement of the second gate 60 releases the pressing force of the second pressing piece 65. The second contact 72*a* accordingly swings to the standard position using the spring force of the second sensor spring, and the second sensor 72 outputs the off-signal.

In this manner, when the off-signal is input from the second sensor 72 through the input processing unit 81 (Yes at Step S208), the control unit 80 waits for an off-signal input from the first sensor 71 until the predetermined time passes (Step S209 and Step S210).

If no off-signals are input from the first sensor 71 through the input processing unit 81 by the end of the predetermined time (No at Step S209 and Yes at Step S210), the control unit 80 outputs an abnormality to the display unit 5 through the display processing unit 85 (Step S211) and has the display unit 5 display a message informing an occurrence of an abnormality. The control unit 80 thereafter returns the procedure and ends this processing.

Figure 19:
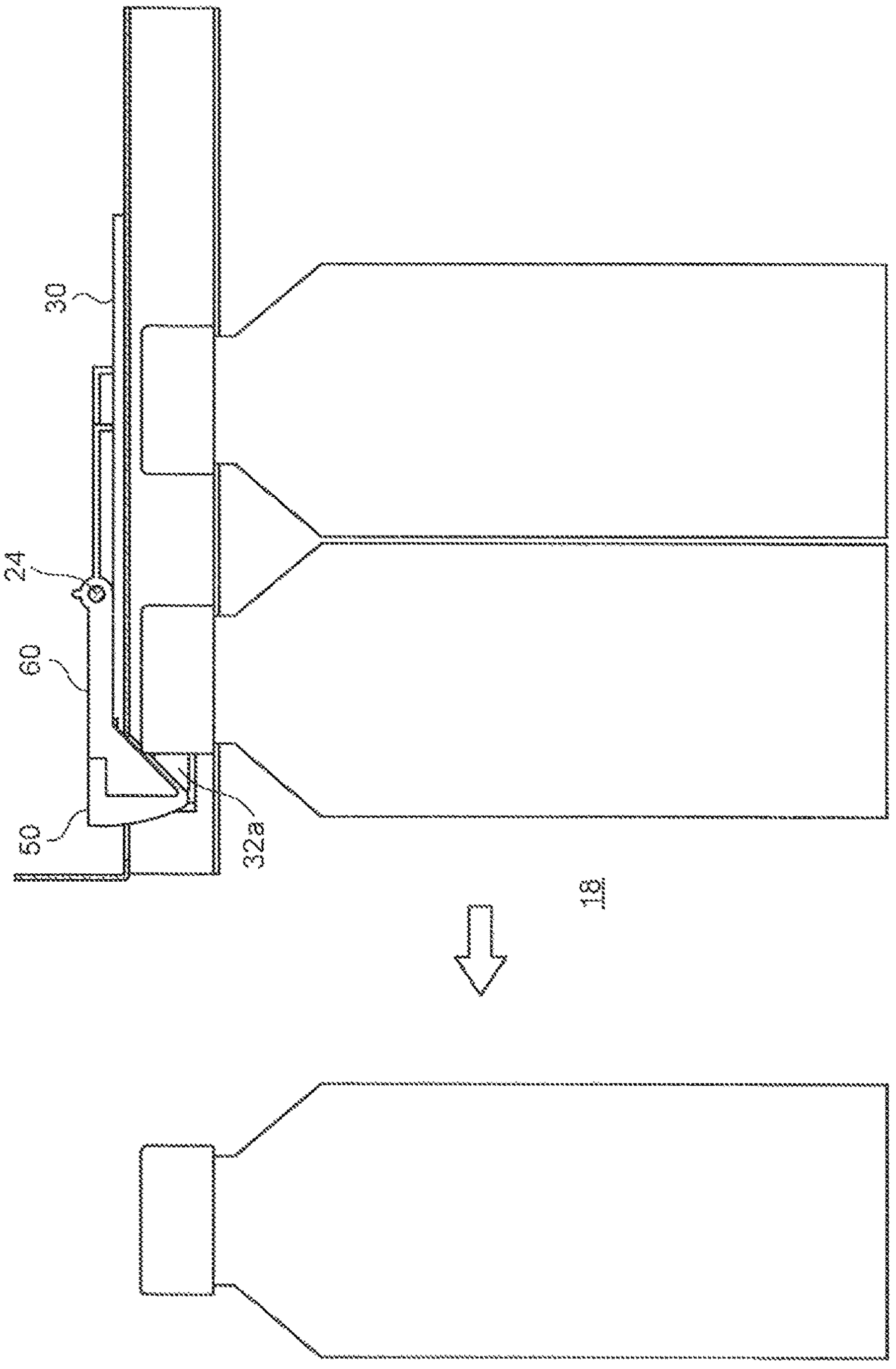
FIG. 19 is still another illustrative drawing that schematically illustrates the product storage column from the right side.

If the off-signal is input from the first sensor 71 through the input processing unit 81 by the end of the predetermined time (Yes at Step S209 and No at Step S210), in other words, as FIG. 19 illustrates, if the forefront product is taken out from the product storage path 18 and the first gate 50 accordingly moves forward with its resilience so that the first gate projecting portion 55 moves into the product storage path 18, which releases the pressing force of the first pressing piece 56, swings the first contact 71*a* to the standard position with the spring force of the first sensor spring, and has the first sensor 71 output the off-signal, the control unit 80 counts the number of taken out products through the measuring processing unit 83 while counting a taken-out product as "+1" (Step S212).

The control unit 80 repeats the processing at Steps S206 to S212 until the close signal is input through the input processing unit 81, that is, until the outer door 2 is closed. If the close signal is input through the input processing unit 81 (Yes at Step S213), the control unit 80 outputs a lock command to the lock mechanism 3 through the lock driving processing unit 87 (Step S214) and turns the lock mechanism 3 to a locked state. The control unit 80 charges through the charging processing unit 84 (Step S215). Specifically, the control unit 80 charges based on the number of products counted through the measuring processing unit 83 and the price of each taken out product.

The control unit 80 performs charging processing in this manner and sends charging information to the management center 100 through the communication processing unit 82 (Step S216). The control unit 80 outputs a charging completed display to the display unit 5 through the display processing unit 85 (Step S217). With this process, the display unit 5 displays a message informing that the charging has been completed.

After outputting the charging completed display, the control unit 80 gives a driving command to the motor 17 through the motor driving processing unit 86 and has the motor 17 drive reversely (Step S218). The control unit 80 thereafter returns the procedure and ends this taking-out control processing.

When the motor 17 is rotated clockwise by 120 degrees in FIG. 3 and the peripheral surface of the first cam portion 141 of the cam 14 faces the left-end surface 15*a* of the link bar 15, the link bar 15 moves toward the left for a certain distance (for example, about 5 mm). The device thereafter returns to a standby state as illustrated in FIGS. 2 to 4.

After performing the taking-out control processing as described above, the control unit 80 returns the procedure and ends this vending control processing.

Figure 20:
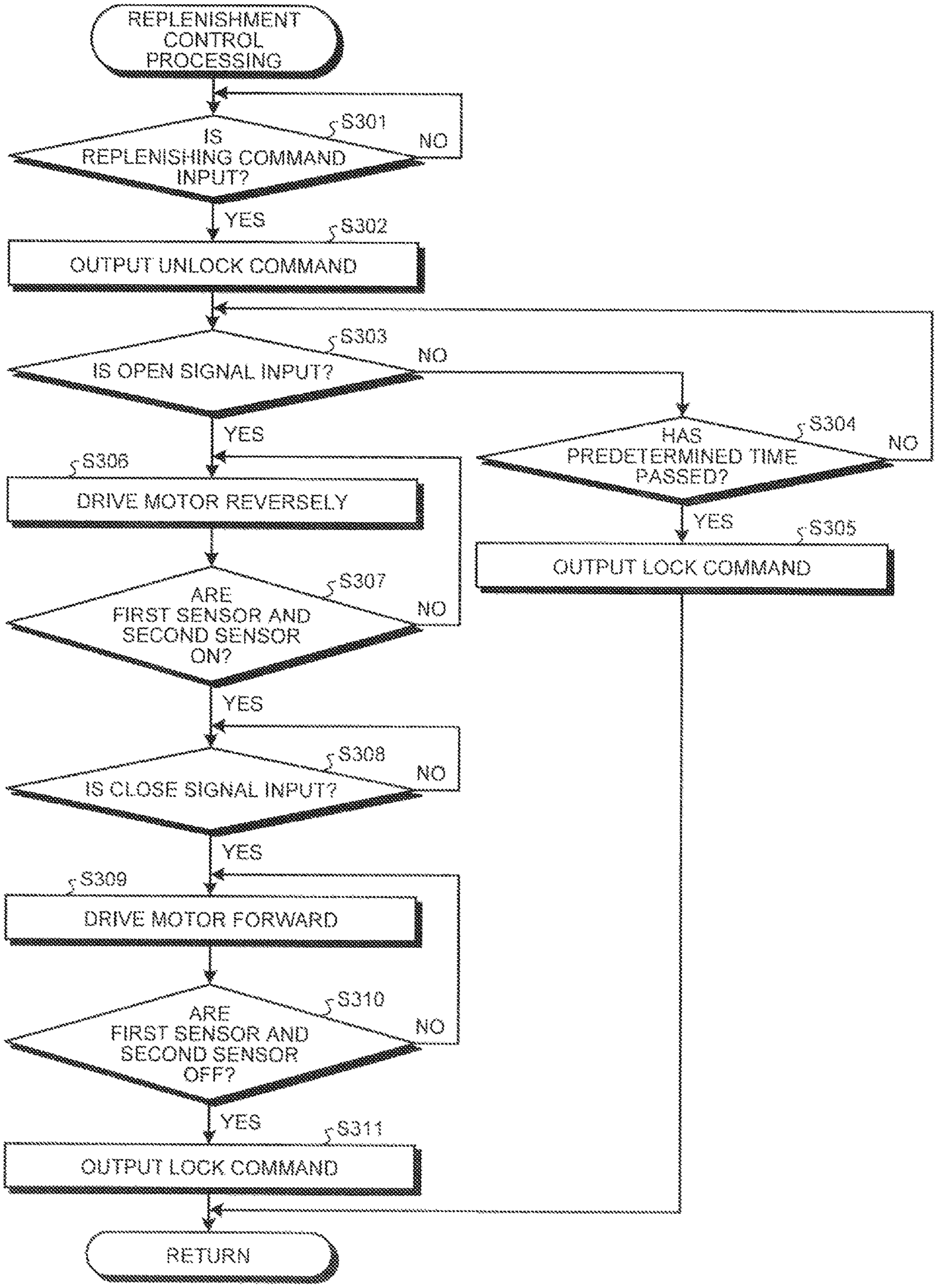
FIG. 20 is a flowchart that illustrates contents of replenishment control processing performed by the control unit illustrated in FIG. 12.

FIG. 20 is a flowchart that illustrates contents of replenishment control processing performed by the control unit illustrated in FIG. 12.

In this replenishment control processing, the control unit 80 waits for a replenishment signal input through the input processing unit 81 (Step S301).

When the replenishment signal output from the replenishment switch 6*a* in response to a pressing operation of the replenishment button 6 by the administrator is input through the input processing unit 81 (Yes at Step S301), the control unit 80 outputs an unlock command to the lock mechanism 3 through the lock driving processing unit 87 (Step S302) and turns the lock mechanism 3 to an unlocked state.

After turning the lock mechanism 3 to the unlocked state, the control unit 80 waits for an open signal input from the door opening and closing sensor 75 through the input processing unit 81 until a predetermined time passes (Step S303 and Step S304).

If no open signals are input from the door opening and closing sensor 75 through the input processing unit 81 by the end of the predetermined time (No at Step S303 and Yes at Step S304), in other words, if the outer door 2 is not opened by the end of the predetermined time, the control unit 80 outputs a lock command to the lock mechanism 3 through the lock driving processing unit 87 (Step S305) and turns the lock mechanism 3 to a locked state. The control unit 80 thereafter returns the procedure and ends this processing.

If the open signal is input from the door opening and closing sensor 75 through the input processing unit 81 during the predetermined time (Yes at Step S303 and No at Step S304), in other words, if the outer door 2 is opened by the end of the predetermined time, the control unit 80 gives a driving command to the motor 17 through the motor driving processing unit 86 and has the motor 17 drive reversely (Step S306). Specifically, the control unit 80 rotates clockwise the motor 17 by 120 degrees in FIG. 3.

With the reverse driving of the motor 17, the peripheral surface of the third cam portion 143 of the cam 14 abuts on the left-end surface 15*a* of the link bar 15, which moves the link bar 15 toward the right for a certain distance (for example, about 15 mm). When the link bar 15 moves toward the right, the link lever 40 having the second connecting portion 43*a* disposed in the connecting groove 15*b* of the link bar 15 rotates around the center axis of the link shaft 41*a*. Specifically, the link lever 40 rotates clockwise by a certain angular distance in FIG. 3.

Figure 21:
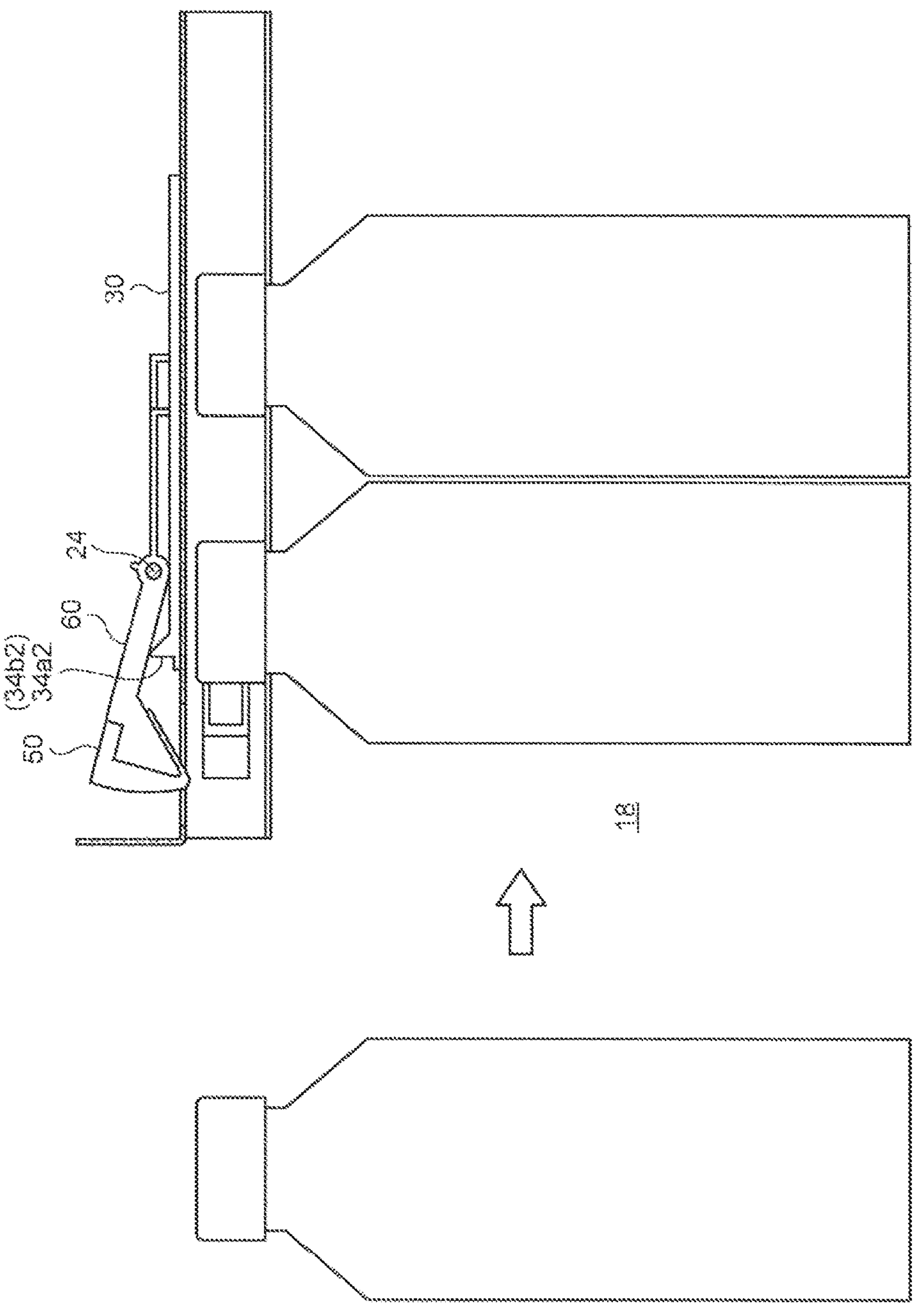
FIG. 21 is still another illustrative drawing that schematically illustrates the product storage column from the right side.

With the rotation of the link lever 40, the slider 30 having the connecting hole 31*a* in which the first connecting portion 42*a* of the link lever 40 is disposed slides in the backward direction against the spring force of the slider spring 35 as illustrated in FIG. 21. In this case, the amount of movement of the slider 30 is larger than the amount of movement at the vending control processing.

With the backward sliding move of the slider 30, as FIG. 21 illustrates, the left forward projecting portion 34*a*2 and the right forward projecting portion 34*b*2 abut the first gate inclination 57 and the second gate inclination 66*b*, slide thereon, and subsequently slide to the bottom surface of the projecting portion 66*a* of the increased width portion 66. With this sliding move, the first gate 50 and the second gate 60 are elastically deformed and move back. The first gate projecting portion 55 and the second gate projecting portion 64 are accordingly separated from the product storage path 18. Consequently, the first pressing piece 56 and the second pressing piece 65 press the first contact 71*a* and the second contact 72*a*, respectively, whereby the first sensor 71 and the second sensor 72 output on-signals.

When the on-signals are input from the first sensor 71 and the second sensor 72 through the input processing unit 81 (Yes at Step S307), the control unit 80 waits for a close signal input from the door opening and closing sensor 75 through the input processing unit 81 (Step S308).

In this manner, the replenishing operation of products is performed under the condition that the control unit 80 is waiting for an input of the close signal.

As described above, because the first gate 50 and the second gate 60 are elastically deformed and in the state of having moved back, the operator (the administrator) can replenish products by inserting the products into the product storage path 18 from the front.

Because the separation distance between the vertex 32*a*1 of the left stopper 32*a* and the vertex 33*a*1 of the right stopper 33*a* is smaller than the lateral width of the cap fitting portion, when the replenished product passes through, the slider left portion 32 and the slider right portion 33 of the slider 30 are elastically deformed so that the separation distance between the vertex 32*a*1 of the left stopper 32*a* and the vertex 33*a*1 of the right stopper 33*a* becomes larger than the lateral width of the cap fitting portion of the target product (the small diameter product).

Figure 22:
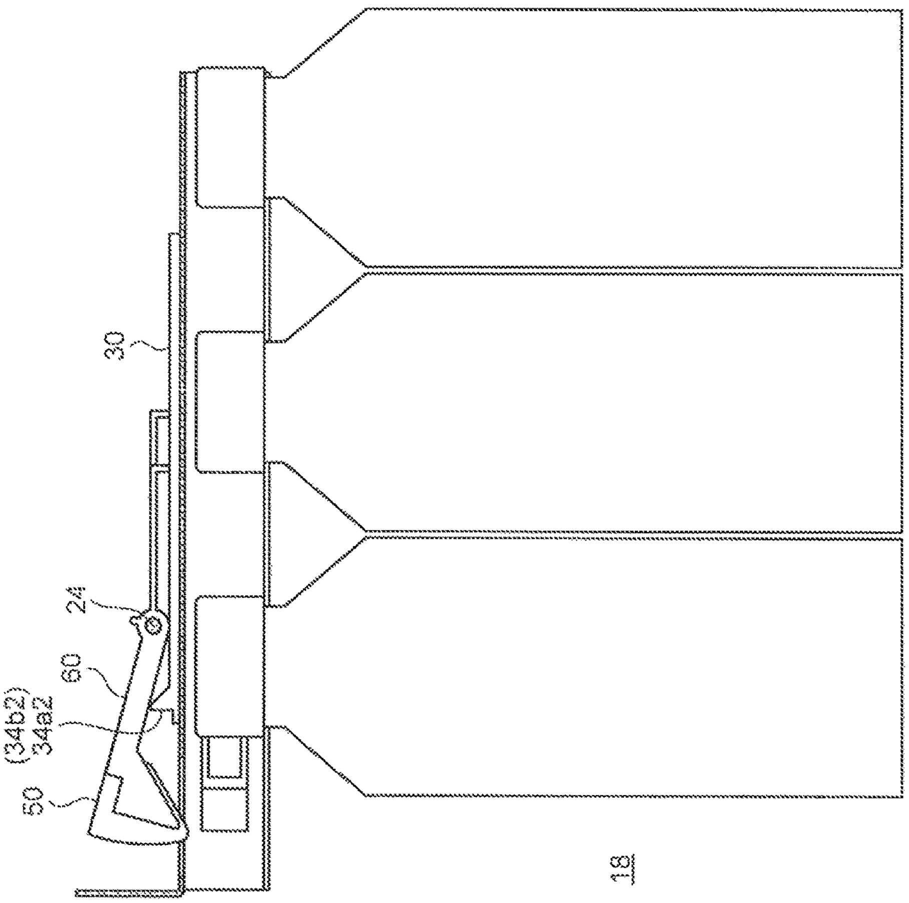
FIG. 22 is still another illustrative drawing that schematically illustrates the product storage column from the right side.

As FIG. 22 illustrates, when the replenished product has passed through, the separation distance between the vertex 32*a*1 of the left stopper 32*a* and the vertex 33*a*1 of the right stopper 33*a* becomes smaller than the lateral width of the cap fitting portion of the target product (the small diameter product) because of the resilience of the slider left portion 32 and the slider right portion 33. This configuration restricts the product once replenished from moving ahead of the space formed between the vertex 32*a*1 of the left stopper 32*a* and the vertex 33*a*1 of the right stopper 33*a* due to the own weight.

After the replenishing operation, the operator closes the outer door 2 and the door opening and closing sensor 75 outputs a close signal to the control unit 80.

When the close signal is input through the input processing unit 81 (Yes at Step S308), the control unit 80 gives the motor 17 a driving command through the motor driving processing unit 86 and has the motor 17 drive forward (Step S309).

This arrangement rotates the motor 17 counterclockwise by 120 degrees in FIG. 3. The peripheral surface of the first cam portion 141 of the cam 14 accordingly faces the left-end surface 15*a* of the link bar 15, which moves the link bar 15 toward the left for a certain distance (for example, about 15 mm). The device thereafter returns to a standby state as illustrated in FIGS. 2 to 4. The forward movement of the first gate 50 releases the first contact 71*a* from being pressed by the first pressing piece 56. The first contact 71*a* accordingly returns to its standard position, and the first sensor 71 outputs an off-signal. Likewise, the forward movement of the second gate 60 releases the second contact 72*a* from being pressed by the second pressing piece 65. The second contact 72*a* accordingly returns to its standard position, and the second sensor 72 outputs an off-signal.

When the off-signals are input from the first sensor 71 and the second sensor 72 through the input processing unit 81 (Yes at Step S310), the control unit 80 outputs a lock command to the lock mechanism 3 through the lock driving processing unit 87 (Step S311) and turns the lock mechanism 3 to a locked state. The control unit 80 thereafter returns the procedure and ends this processing.

As described above, the product storage device of this embodiment has such a gate operation mechanism that keeps the first gate 50 and the second gate 60 in the state of having moved forward to the most downstream area when the cam mechanism 13, the slider 30, and the link lever 40 are in a standby state and allows the first gate 50 and the second gate 60 to move back from the most downstream area upon receipt of an operation command. Furthermore, the first sensor 71, the second sensor 72, and the control unit 80 configures a measuring unit that measures the number of products taken out from the product storage path 18 by counting the number of changes in the first gate 50 from a backward movement to a forward movement after the second gate 60 has changed from a backward movement to a forward movement.

In summary, the product storage device of an embodiment of the present disclosure keeps the first gate 50 and the second gate 60 in a state of having moved forward to the front area located ahead of the forefront product in the product storage path 18 when the device is in a standby state. This configuration may restrict the products stored in the product storage path 18 to be taken out. Furthermore, the product storage device allows the first gate 50 and the second gate 60 to move back from the front area upon receipt of an operation command, which allows any number of products to be taken out. The product storage device can measure the number of products taken out from the product storage path 18 by counting the number of changes in the first sensor 71 from the on-state to the off-state after the second sensor 72 has changed from the on-state to the off-state. In this manner, the product storage device can vend a plurality of products in a single vending opportunity.

With the product storage device, if a predetermined time has passed without having a change in the first sensor 71 from the off-state to the on-state after the second sensor 72 has changed from the on-state to the off-state, the product storage device informs the occurrence of an abnormality. This configuration can, for example, prevent the user from leaving without forgetting to take out the product.

With the above-described product storage device, in the ordinary condition, the slider 30 has the separation distance between the left stopper 32*a* and the right stopper 33*a* smaller than the lateral width of the cap fitting portion of the product. When the product passes through, the slider 30 is elastically deformed by being pressed by the product and accordingly has the separation distance between the left stopper 32*a* and the right stopper 33*a* larger than the lateral width of the cap fitting portion of the product. This configuration can prevent the first gate 50 and the second gate 60 from being affected by the weight of a product positioned in the back when the forefront product is taken out. The configuration can further prevent the product once replenished from returning to the forefront area of the product storage path 18 in replenishing the products. The elastic deformation made when a product passes through can provide the user a sense of clicking in taking out and in replenishing the products.

A preferred embodiment of the present disclosure has been described as above; however, the present disclosure is not limited thereto and various changes can be made.

In the above-described embodiment, the number of products taken out from the product storage path 18 is measured by counting the number of changes in the first sensor 71 from the on-state to the off-state after the second sensor 72 has changed from the on-state to the off state. In the present disclosure, however, the number of products taken out from the product storage path may be measured by counting the number of changes in at least one of the first gate and the second gate from a backward movement to a forward movement.

In the above-described embodiment, a change of the first gate 50 from a backward movement to a forward movement and a change of the second sensor 72 from a backward movement to a forward movement are detected using the first sensor 71 and the second sensor 72. In the present disclosure, however, any method of detection may be applicable as long as such timings are determined that the first gate 50 and the second gate 60 each have changed from a backward movement to a forward movement.

In the above-described embodiment, the first gate 50 and the second gate 60 move back from the product storage path 18 by being elastically deformed and move forward to the product storage path 18 using the resilience. In the present disclosure, however, the first gate and the second gate may swingably move back and forward from and to the product storage path.

According to the present disclosure, in a standby state, a gate operation mechanism maintains a first gate and a second gate in a state of having moved forward to the most downstream area. This configuration may restrict products stored in the product storage path to be taken out. Furthermore, the gate operation mechanism allows the first gate and the second gate to move back from the most downstream area upon receipt of an operation command, which consequently allows any number of products to be taken out. A measuring unit measures the number of products taken out from the product storage path by counting the number of changes in at least one of the first gate and the second gate from a backward movement to a forward movement. This configuration has an effect of vending a plurality of products in a single vending opportunity.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A product storage device comprising:

a product storage column configured to store products in a manner aligned in a row in a product storage path defined by the product storage column;

a first gate configured to move back from and forward to a most downstream area of the product storage column that is downstream of a product positioned in a most downstream side of the product storage path;

a second gate disposed in an upstream side with respect to the first gate and configured to move back from and forward to the most downstream area;

a slider configured to keep the first gate and the second gate in a state of having moved forward to the most downstream area in a standby state, in which the products are prevented from being taken out from the product storage path, and to allow the first gate and the second gate to move back from the most downstream area when an operation command is given; and a measuring unit that includes sensors and a control unit and that is configured to measure number of products taken out from the product storage path by counting number of changes in at least one of the first gate and the second gate from a backward movement to a forward movement.

2. The product storage device according to claim 1, wherein the control unit measures the number of products taken out from the product storage path by counting a number of changes in the first gate from a backward movement to a forward movement after the second gate has changed from a backward movement to a forward movement.

3. The product storage device according to claim 2, wherein the control unit informs an occurrence of abnormality when a predetermined time has passed without detecting a change in the first gate from a backward movement to a forward movement after the second gate has changed from a backward movement to a forward movement.

4. The product storage device according to claim 1, wherein the second gate includes one or more increased width portions, so that, due to a contact between the one or more increased width portions and a surface of the first gate, the surface of the first gate facing the product storage path, when the second gate moves back along with the first gate from the product storage path and when the second gate moves forward to the product storage path, the second gate moves forward independently.

5. The product storage device according to claim 2, wherein the second gate includes one or more increased width portions, so that, due to a contact between the one or more increased width portions and a surface of the first gate, the surface of the first gate facing the product storage path, when the second gate moves back along with the first gate from the product storage path and when the second gate moves forward to the product storage path, the second gate moves forward independently.

6. The product storage device according to claim 3, wherein the second gate includes one or more increased width portions, so that, due to a contact between the one or more increased width portions and a surface of the first gate, the surface of the first gate facing the product storage path, when the second gate moves back along with the first gate from the product storage path and when the second gate moves forward to the product storage path, the second gate moves forward independently.

7. The product storage device according to claim 4, wherein the slider includes stoppers that move forward to the product storage path in a manner facing each other and, in an ordinary condition, makes a separation distance between the stoppers smaller than a width of the product and, when the product passes through, makes the separation distance larger than the width of the product by being elastically deformed by a press from the product.

8. The product storage device according to claim 7, wherein, when a replenishing command is given, the slider is in contact with the second gate to force the second gate to move back along with the first gate.

9. The product storage device according to claim 4, wherein, when a replenishing command is given, the slider is in contact with the second gate to force the second gate to move back along with the first gate.

10. The product storage device according to claim 5, wherein the slider includes stoppers that move forward to the product storage path in a manner facing each other and, in an ordinary condition, makes a separation distance between the stoppers smaller than a width of the product and, when the product passes through, makes the separation distance larger than the width of the product by being elastically deformed by a press from the product.

11. The product storage device according to claim 10, wherein, when a replenishing command is given, the slider is in contact with the second gate to force the second gate to move back along with the first gate.

12. The product storage device according to claim 5, wherein, when a replenishing command is given, the slider is in contact with the second gate to force the second gate to move back along with the first gate.

13. The product storage device according to claim 6, wherein the slider includes stoppers that move forward to the product storage path in a manner facing each other and, in an ordinary condition, makes a separation distance between the stoppers smaller than a width of the product and, when the product passes through, makes the separation distance larger than the width of the product by being elastically deformed by a press from the product.

14. The product storage device according to claim 13, wherein, when a replenishing command is given, the slider is in contact with the second gate to force the second gate to move back along with the first gate.

15. The product storage device according to claim 6, wherein, when a replenishing command is given, the slider is in contact with the second gate to force the second gate to move back along with the first gate.

* * * * *